July 12, 1966  A. J. MALAVAZOS ET AL  3,260,451

CALCULATING MACHINE

Filed Jan. 2, 1964  16 Sheets-Sheet 1

INVENTORS
ARTHUR J. MALAVAZOS
JOHN W. JAMIESON

BY

ATTORNEY

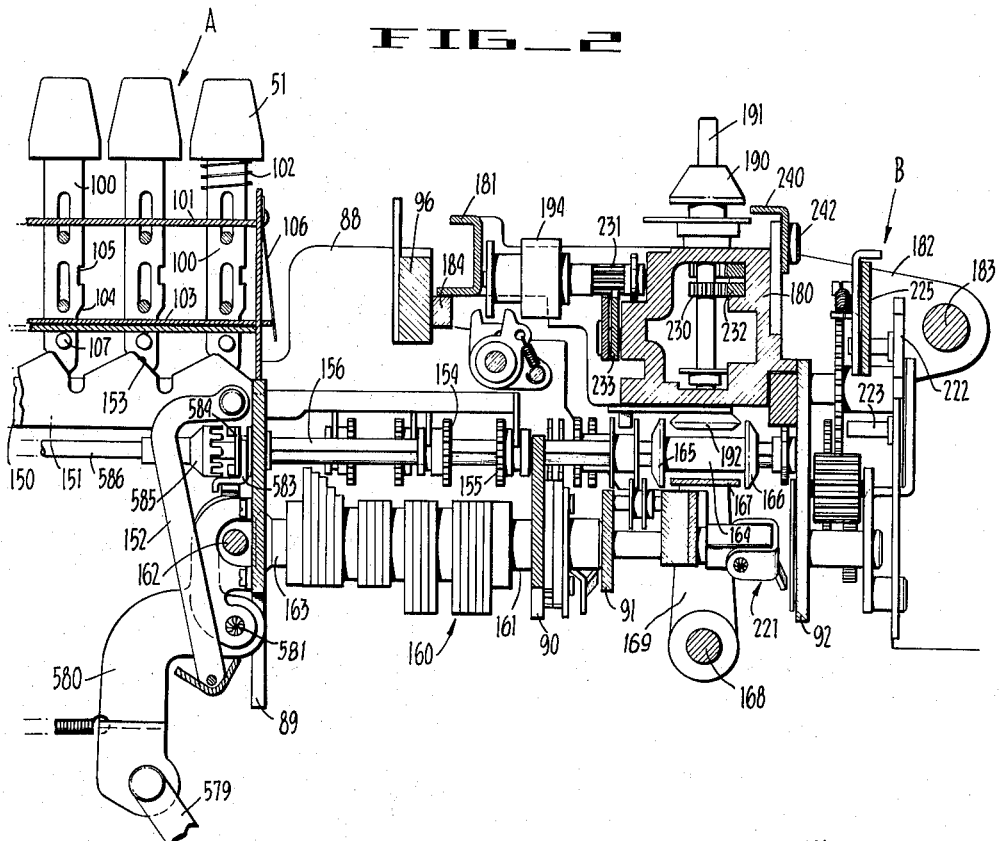
FIG_2
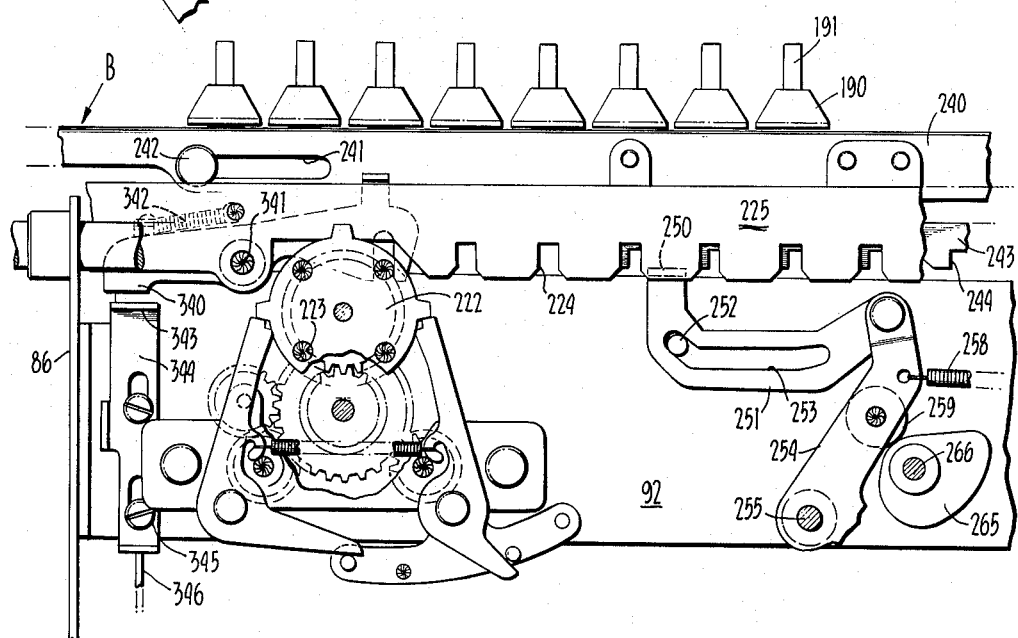
FIG_3

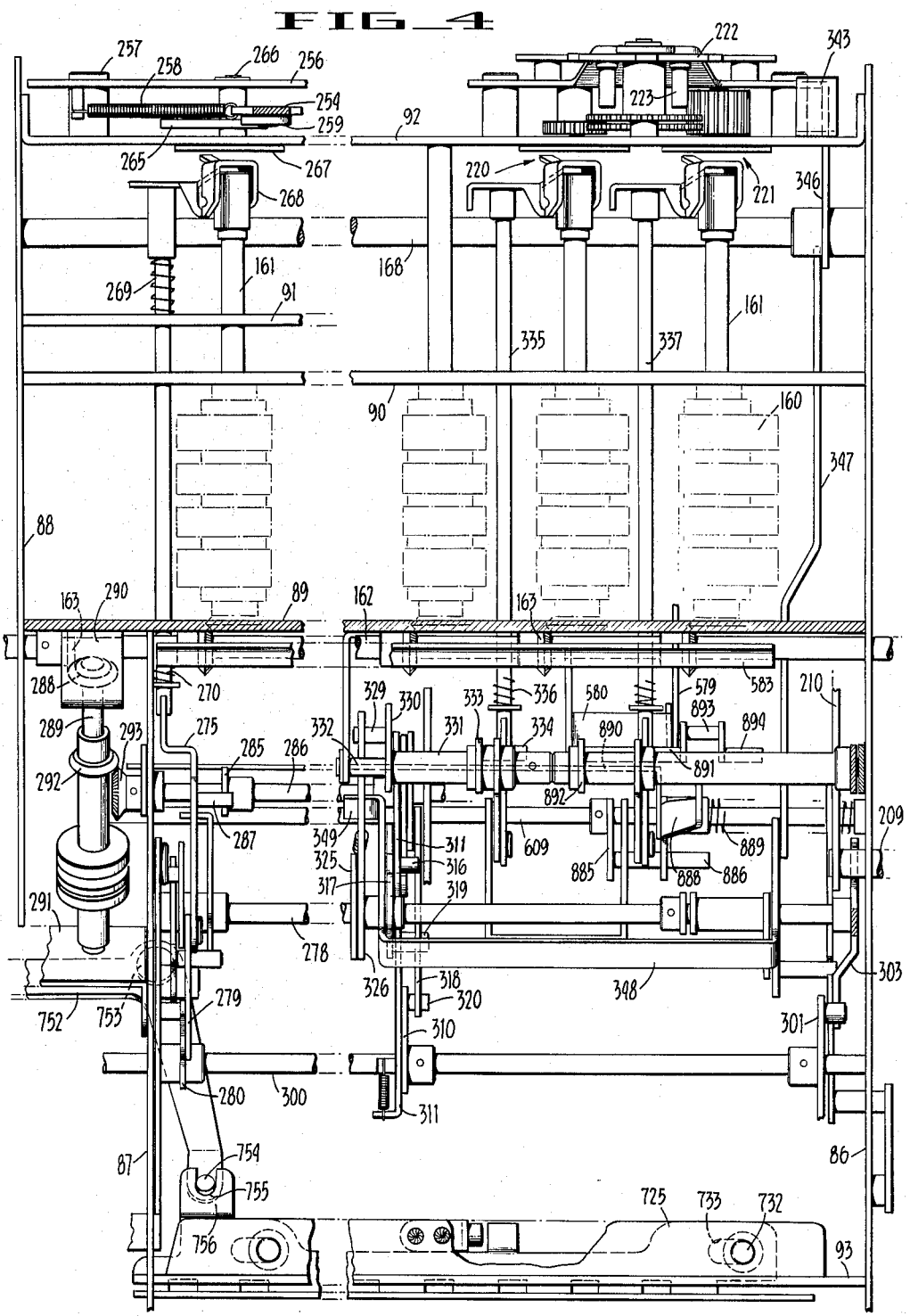

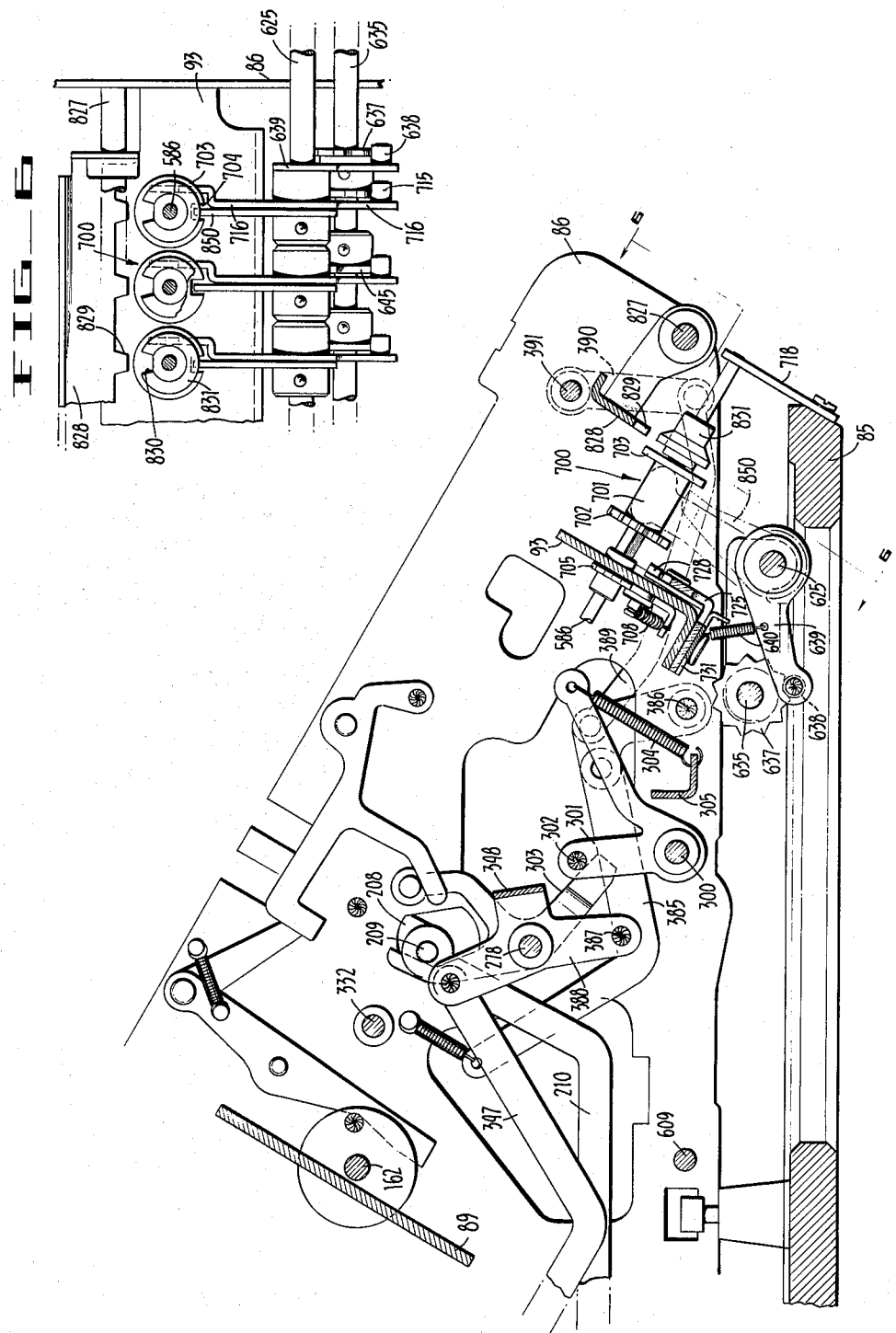

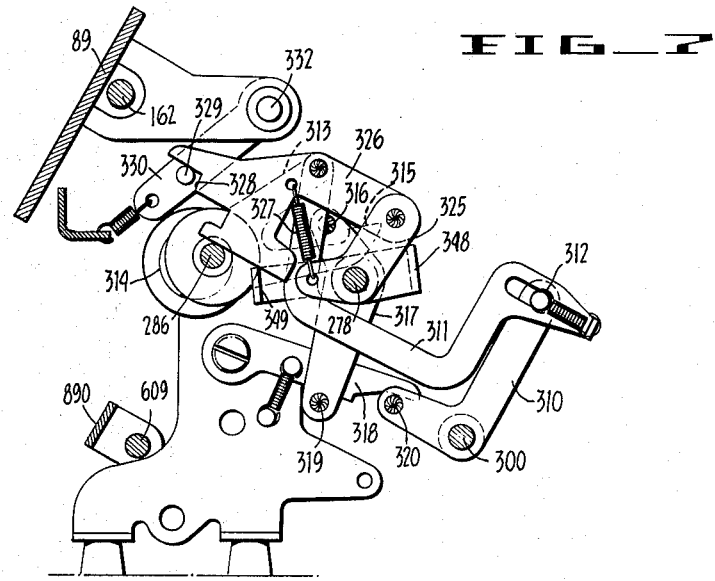
FIG_7
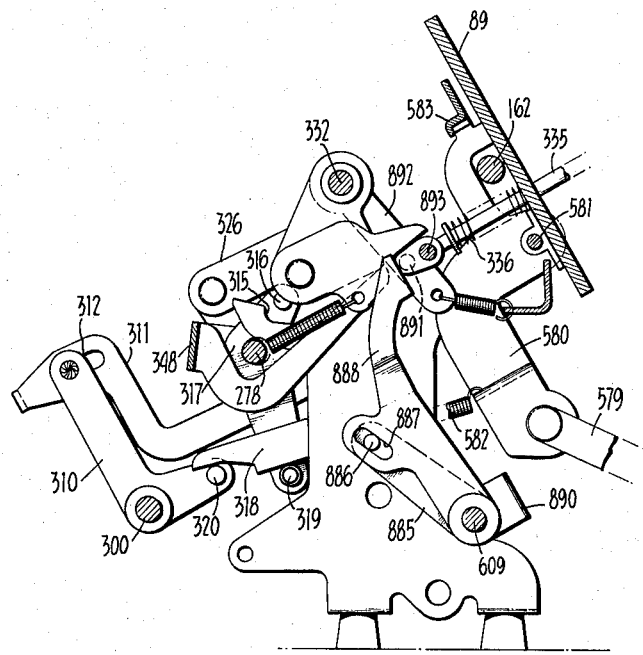
FIG_8

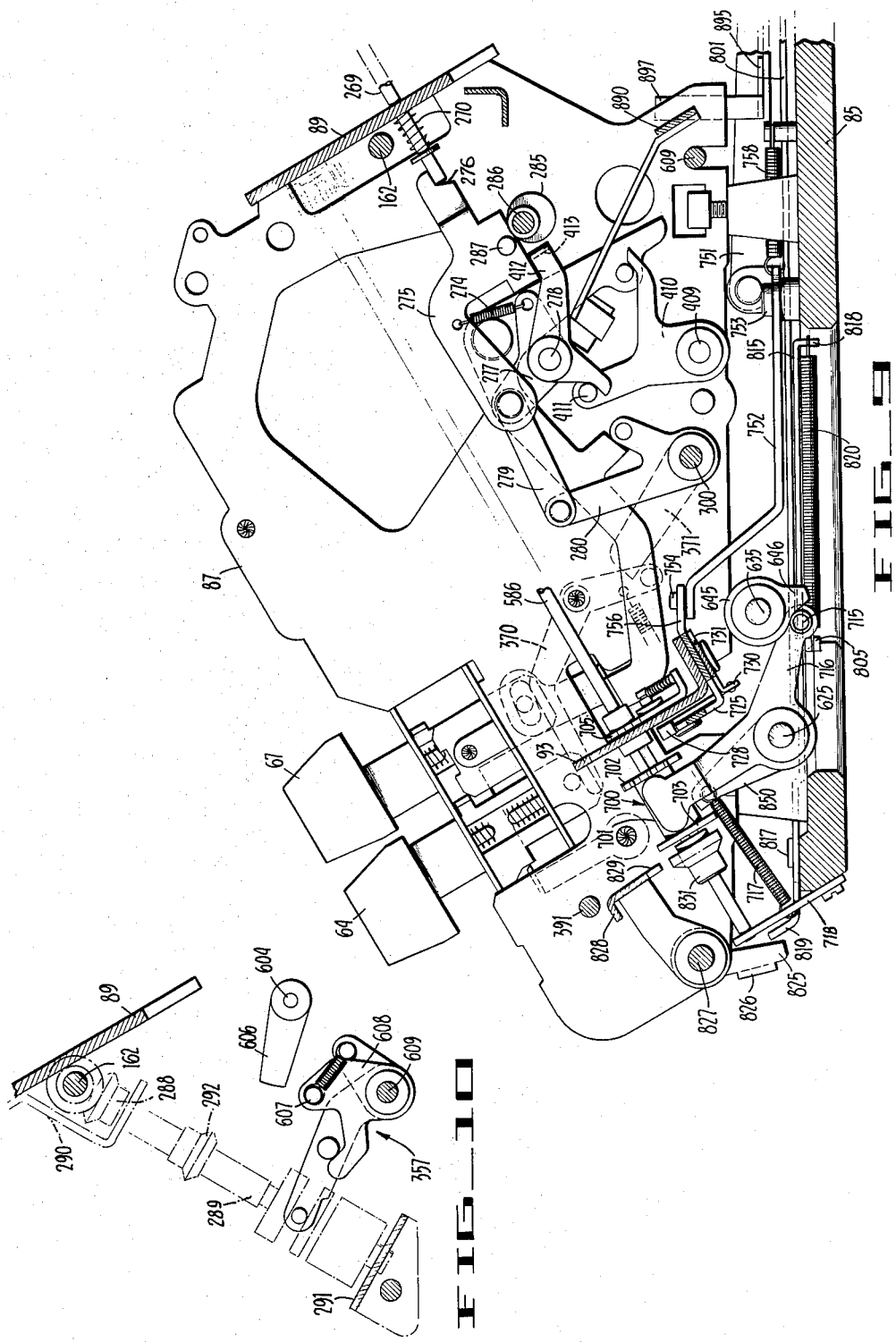

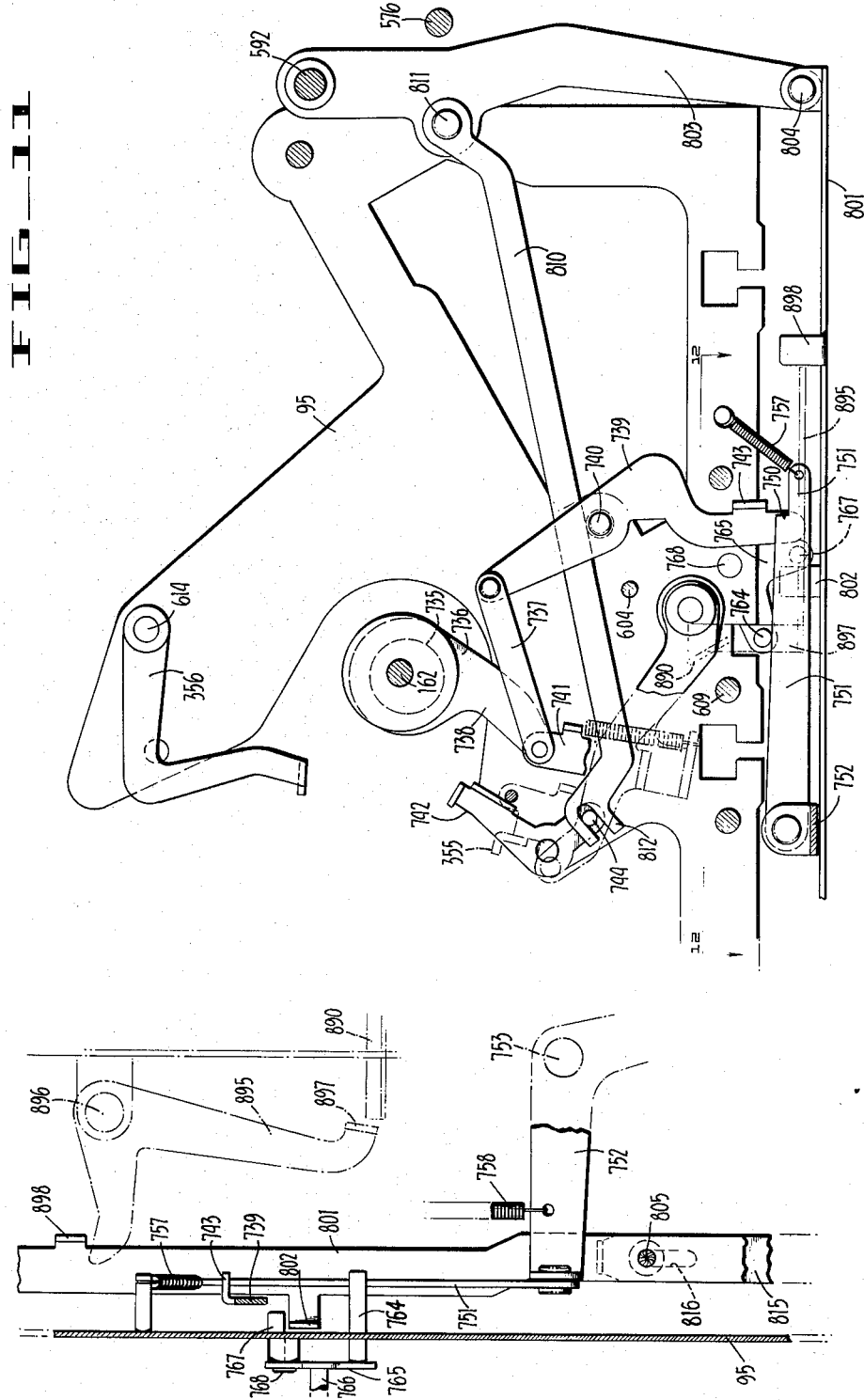

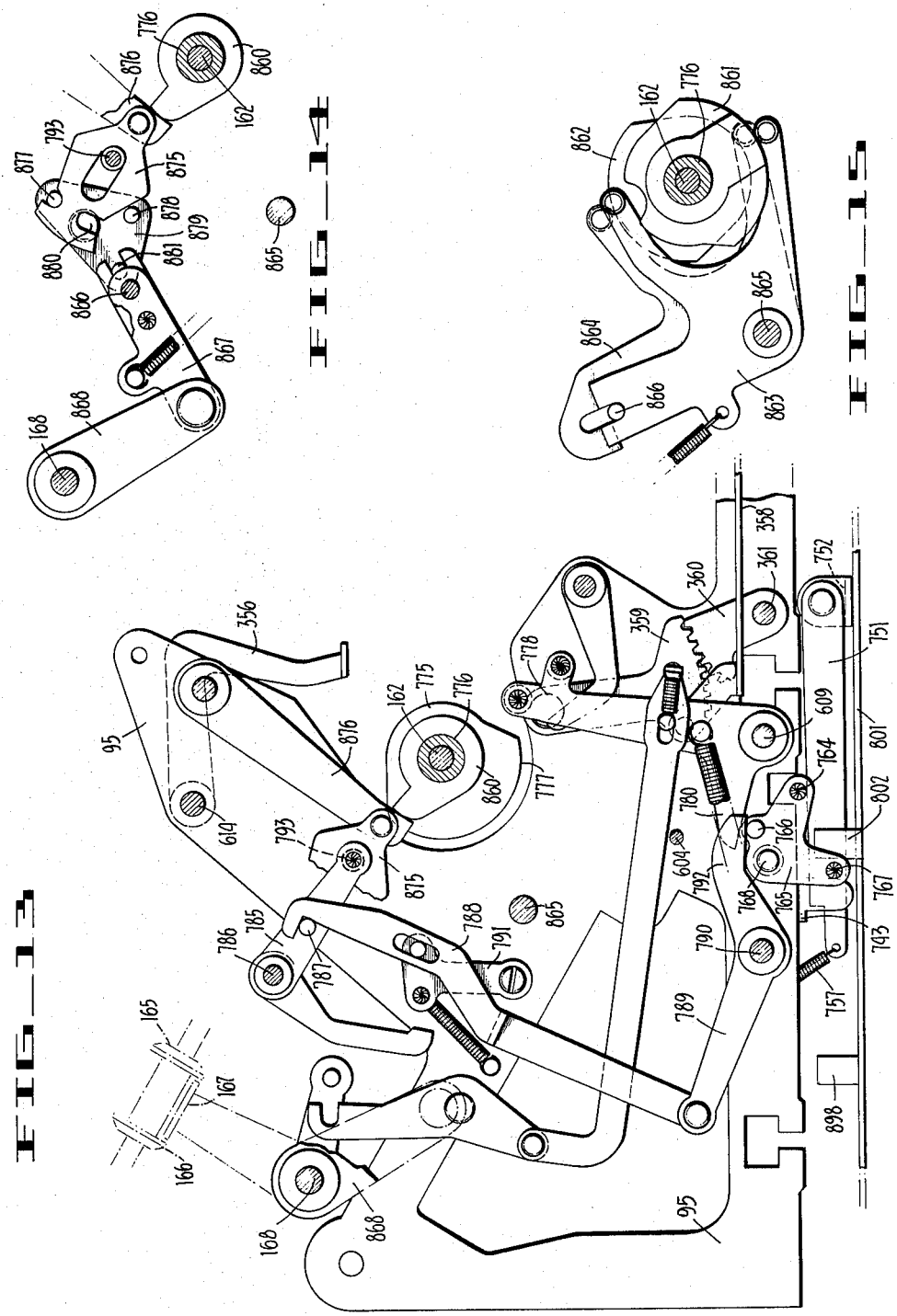

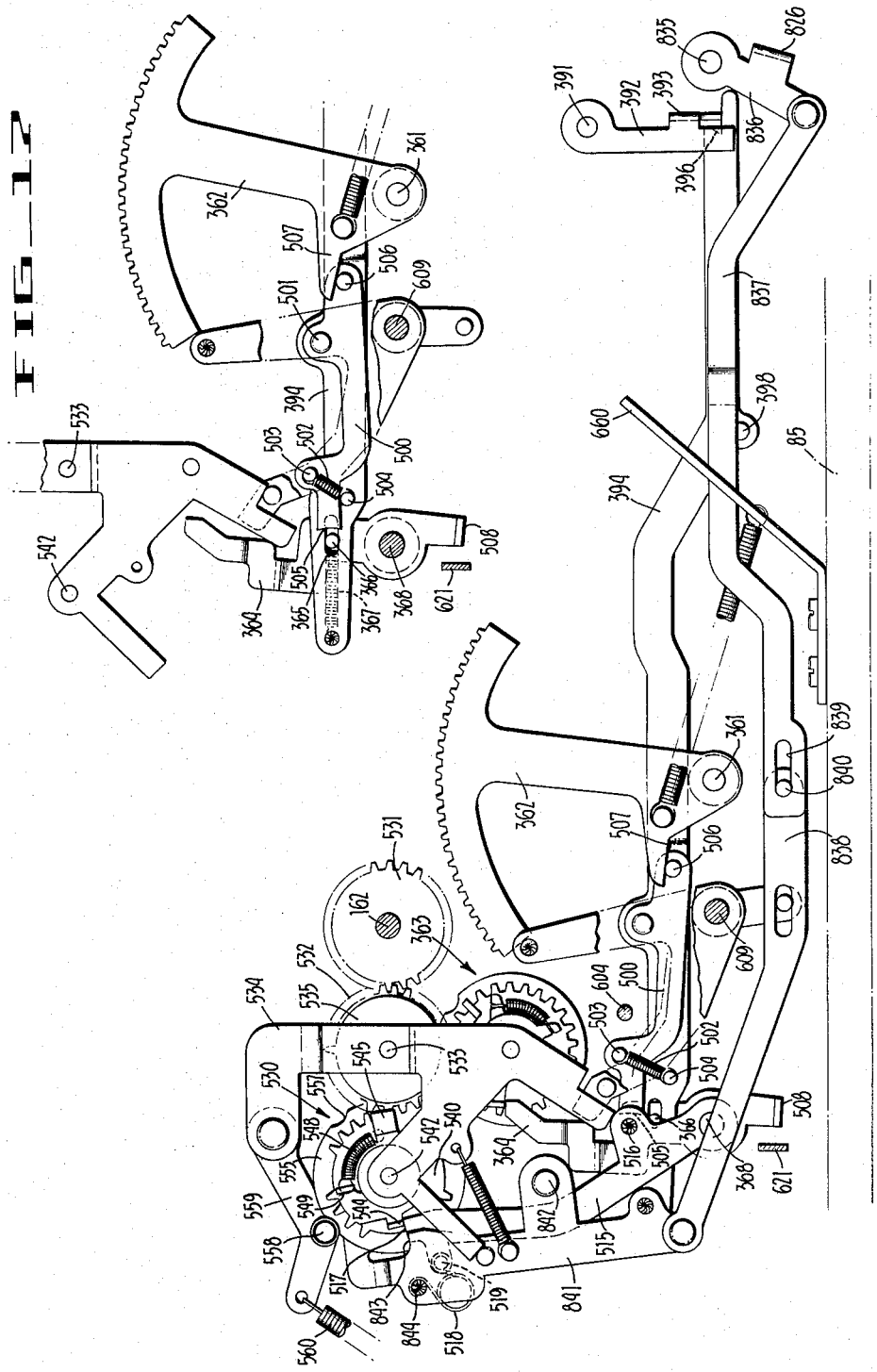

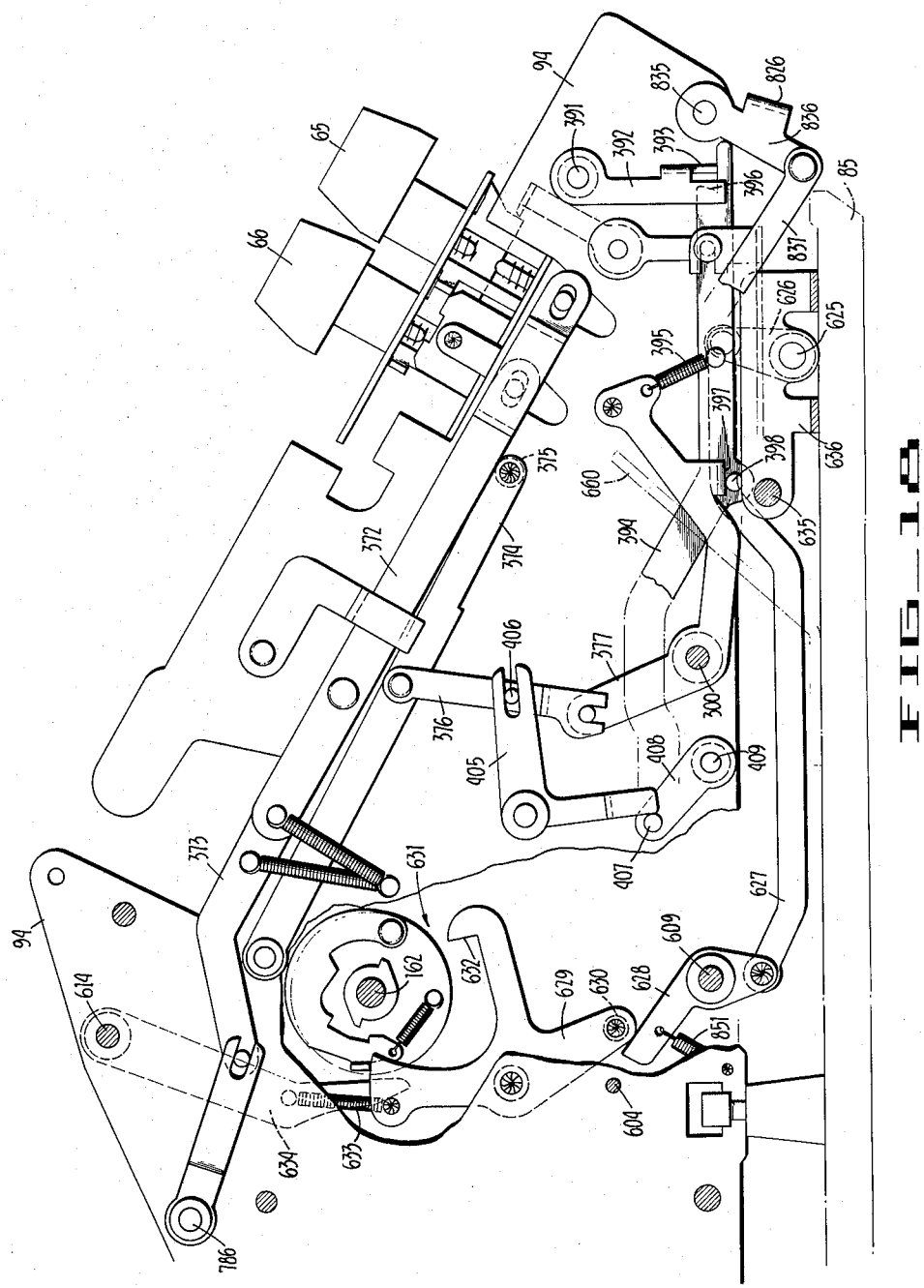

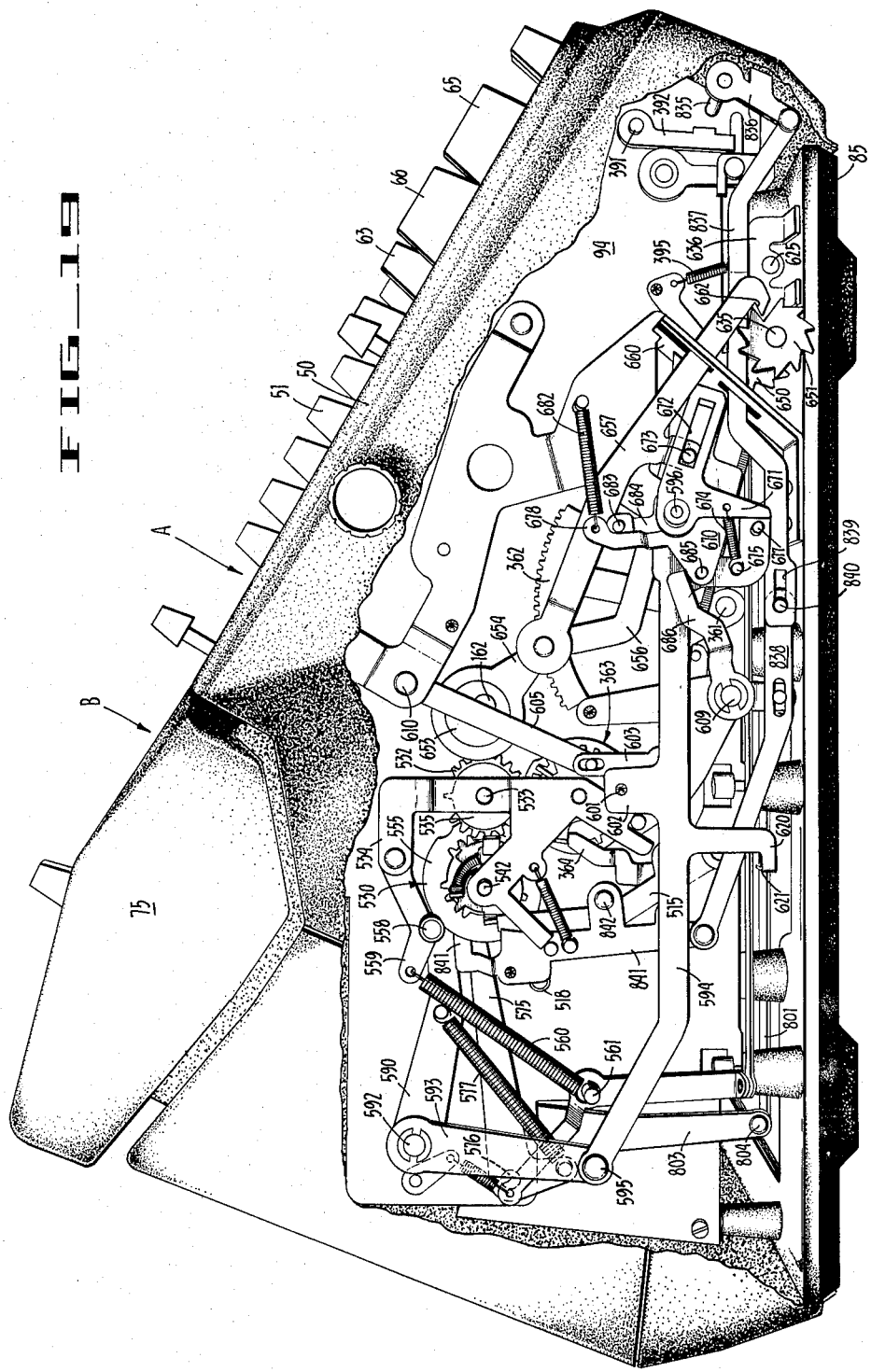

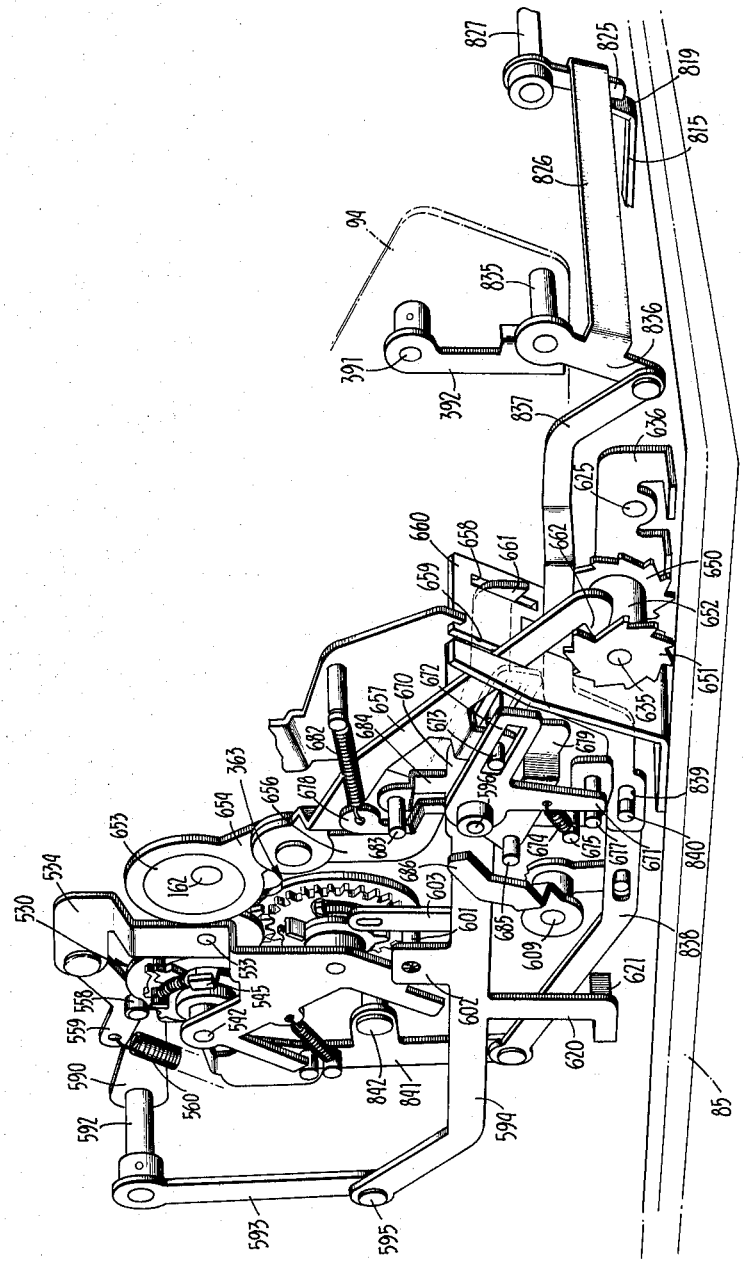

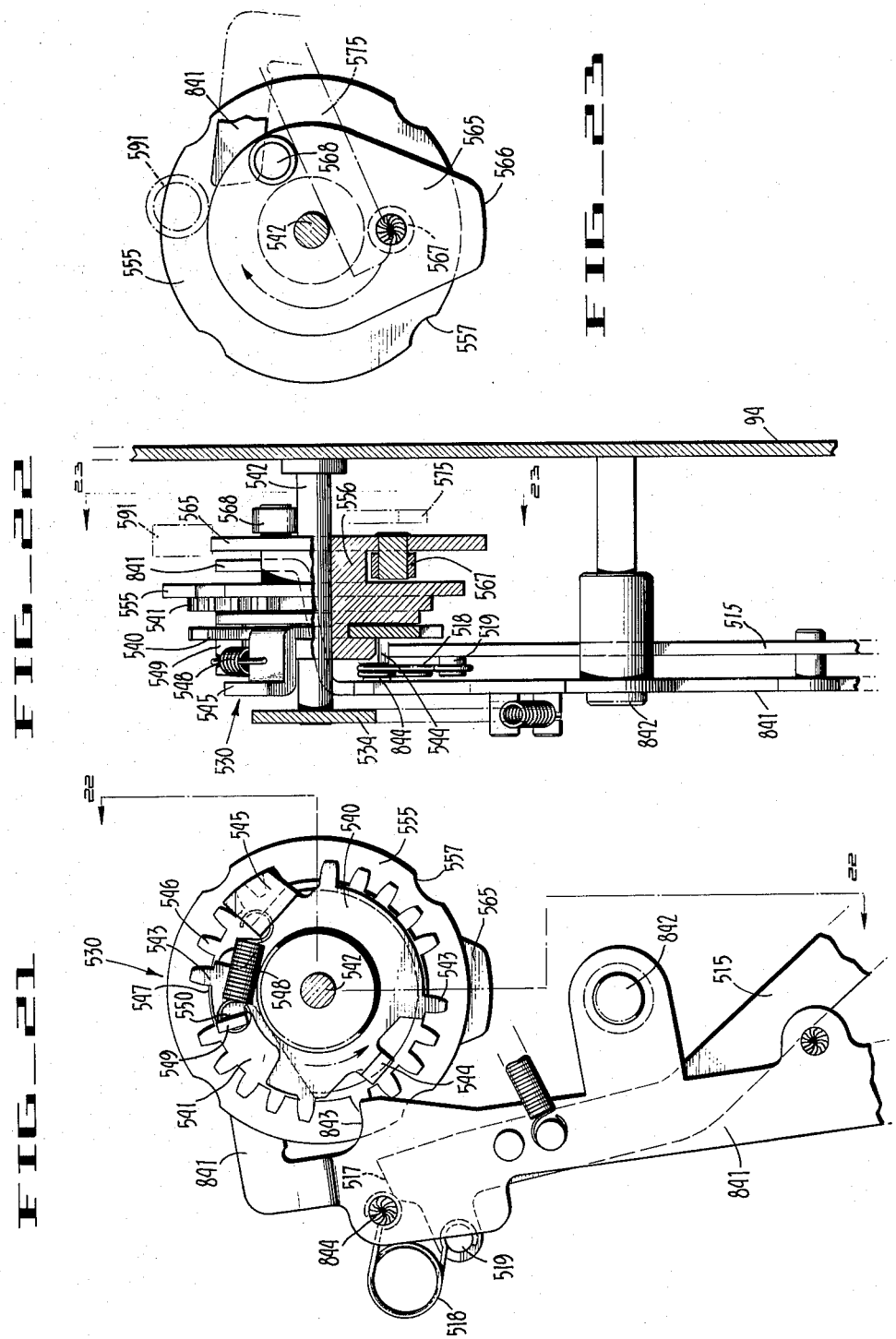

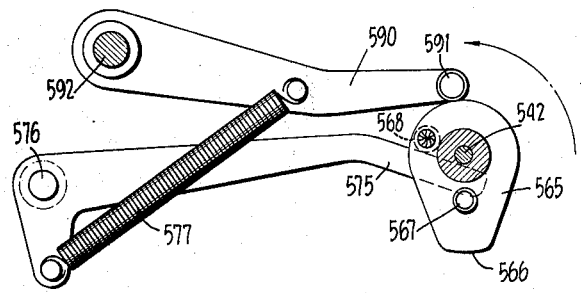
FIG_24
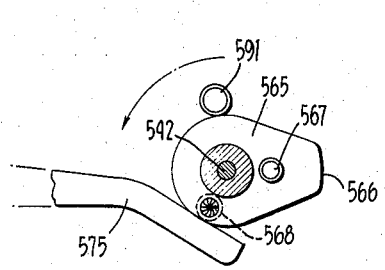
FIG_25
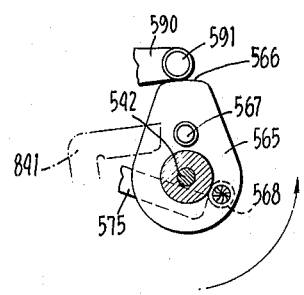
FIG_26
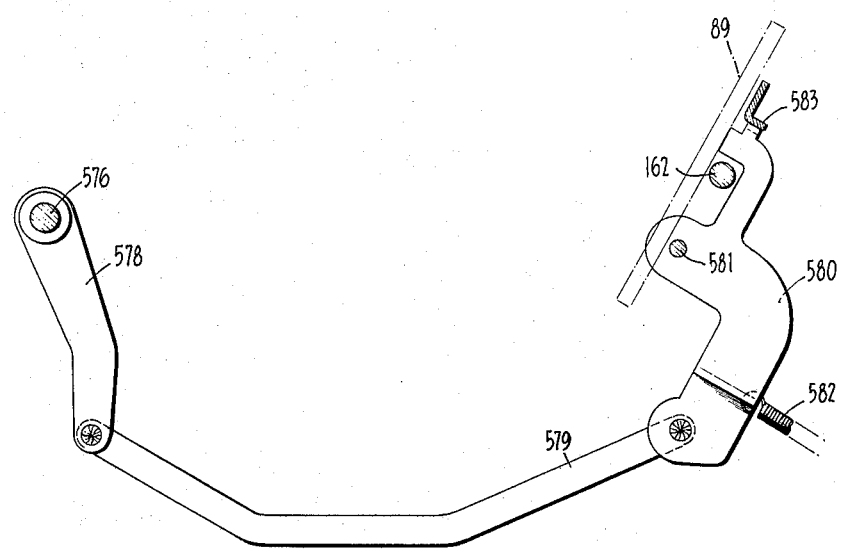
FIG_27

July 12, 1966
A. J. MALAVAZOS ET AL
3,260,451
CALCULATING MACHINE
Filed Jan. 2, 1964
16 Sheets-Sheet 15
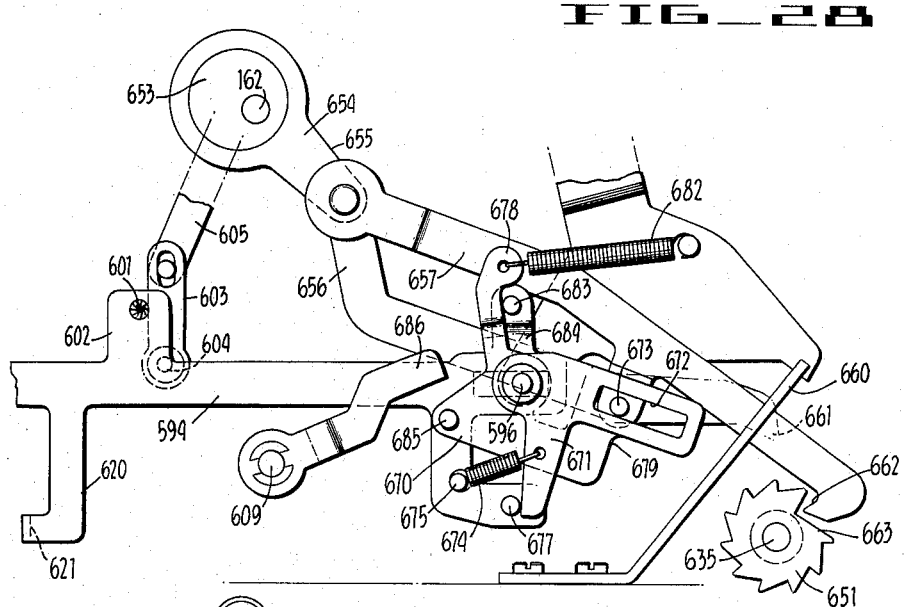
FIG_28
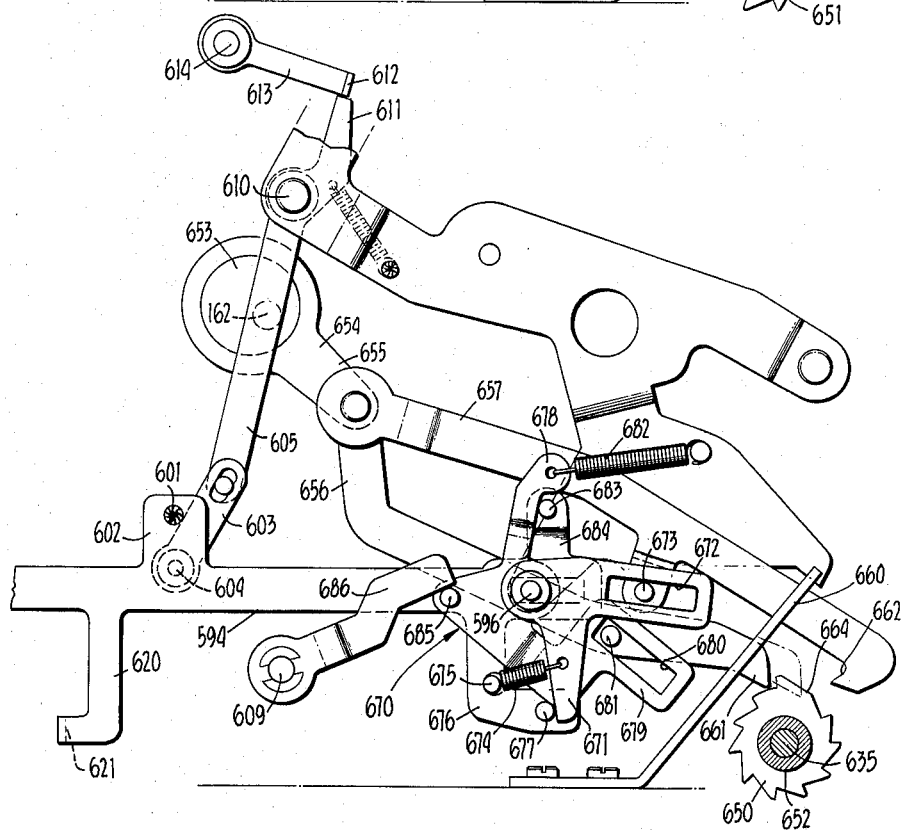
FIG_29

July 12, 1966
A. J. MALAVAZOS ET AL
3,260,451
CALCULATING MACHINE
Filed Jan. 2, 1964
16 Sheets-Sheet 16
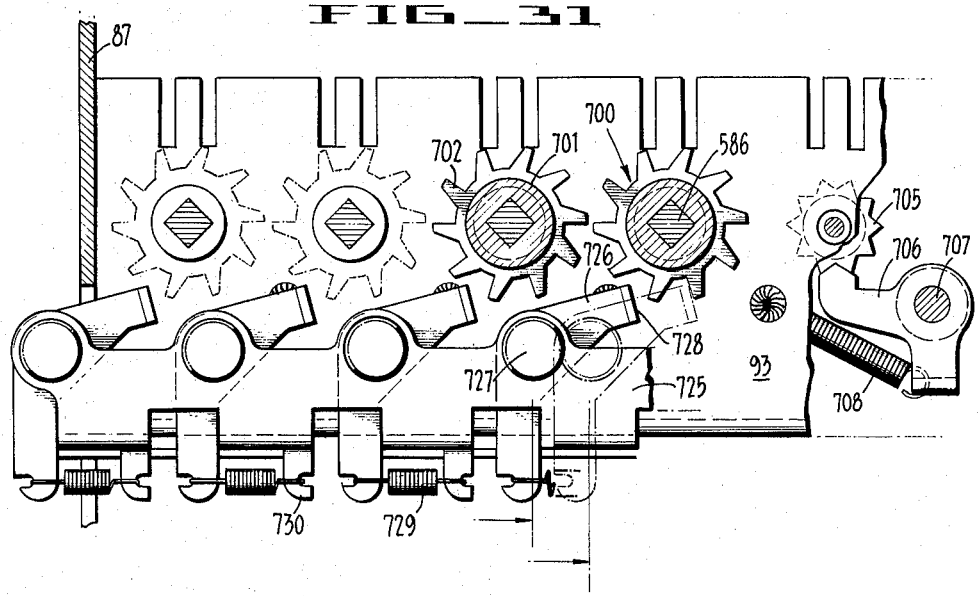
FIG_31
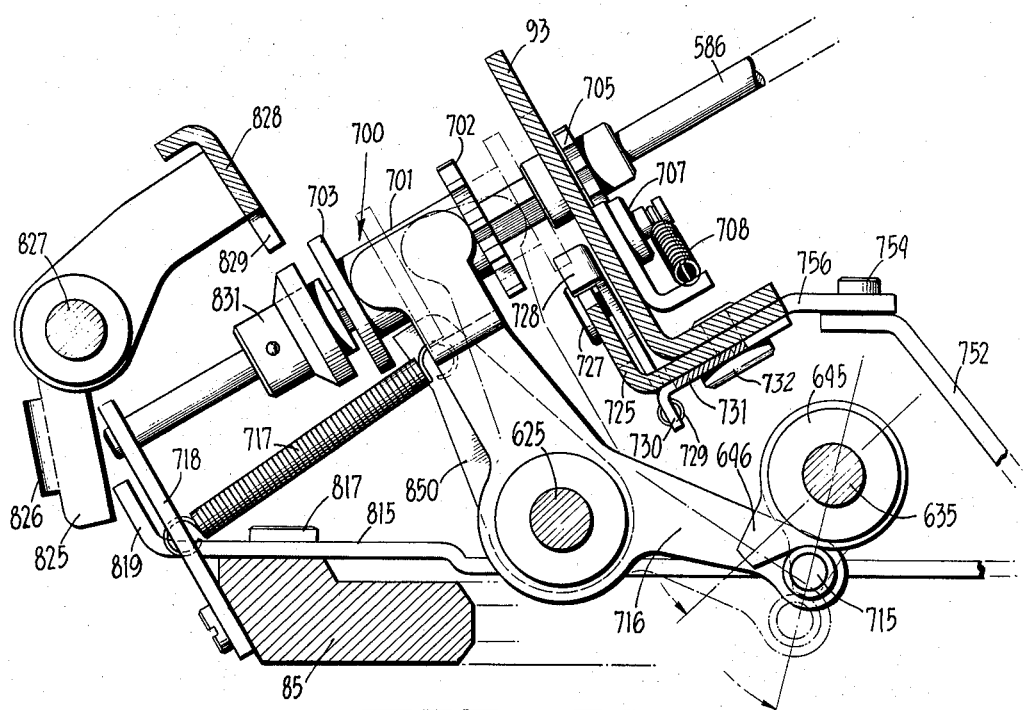
FIG_30

United States Patent Office 3,260,451
Patented July 12, 1966

1

3,260,451
CALCULATING MACHINE
Arthur J. Malavazos, Hayward, and John W. Jamieson, San Leandro, Calif., assignors to Friden, Inc., a corporation of Delaware
Filed Jan. 2, 1964, Ser. No. 335,156
5 Claims. (Cl. 235—63)

Index

| | Column |
|---|---|
| I. Normal Mechanisms | 3 |
|    1. General Arrangement | 4 |
|    2. Keyboard | 5 |
|    3. Selection Mechanism | 5 |
|    4. Actuating Mechanism | 5 |
|    5. Accumulator Mechanism | 6 |
|    6. Clutch and Drive Mechanism | 6 |
|    7. Carriage Shifting Mechanism | 7 |
|    8. Register Clearing Mechanism | 7 |
|    9. Automatic Shifting Mechanism | 9 |
|    10. Shift Terminating Mechanism | 10 |
|    11. Multiplying Mechanism | 11 |
| II. Squaring Mechanism | 15 |
|    (1) Interlock Between Normal and Auxiliary Multiplication | 16 |
|    (2) Auxiliary Clutch and Cam | 17 |
|    (3) Setting of Keyboard Value into Auxiliary Register | 20 |
|    (4) Storage Register | 21 |
|    (5) Condition Machine for Control by Auxiliary Register | 23 |
|       (a) Block Operation of Normal Multiplying Mechanism | 23 |
|       (b) Initiate Operation of Multiplier Control Clutch | 24 |
|       (c) Enable Operation of the Cam Shaft 635 | 25 |
|       (d) Enable Operation of the Feed Bar | 28 |
|       (e) Interordinal Shift Control | 30 |
|       (f) Termination | 31 |
|    (6) Operation | 32 |

This invention relates to calculating machines, and particularly to an improved squaring mechanism therefor.

It is one primary object of the present invention to provide a squaring mechanism which can be used in conjunction with the multiplying mechanism described in the patents to Friden, Nos. 2,371,752 of March 20, 1945, or 2,399,917 of May 7, 1946—although such a multiplying mechanism is disabled during a squaring operation.

Another primary and important object of the present invention is to provide a squaring machine in which a factor inserted in the main keyboard of the calculating machine is multiplied by itself. In the present invention the keyboard value is set from the keyobard into an auxiliary, or storage, register without the customary clearing of the keyboard. The preferred form of this auxiliary register is an ordinally arranged set of register wheels lying in front of the main keyboard. Values are transmitted into this storage register from the main keyboard through a mechanism quite similar to the back-transfer mechanism shown in our copending application, Serial No. 248,343, filed December 31, 1962. This setting of the keyboard value into the storage register is followed by a multiplication operation in which the keyboard value remains as the multiplicand and the value in the storage register controls the program of operations as the muliplier value—thus multiplying the keyboard value by itself.

Another object of the present invention is to provide duplicate multiplying mechanisms, so that a multiplicand factor standing in the keyboard of the machine can be multiplied by a factor inserted in a conventional multi-

2 plier storage device, such as those described in the Friden patents above-mentioned, or selectively, at the will of the operator, a factor standing in the main keyboard can be squared, or multiplied by itself. In its preferred form, the two multiplier mechanisms are independent, although they use the same controls and are operated by the same multiplier control keys. In this instance, the two multiplying mechanisms are interlocked so that one, and only one, of the two mechanisms, can control a particular operation. In its preferred form, the multiplication mechanism utilizes the operating controls of the Malavazos patent, No. 3,090,554, and also the three manually operated keys which are effective to initiate the three types of multiplication described in the Friden and Malavazos patents.

In its preferred form, this invention utilizes a calculating machine which is basically the machine of the patent to Friden No. 2,229,889, issued January 28, 1941, and modified by the two Friden patents previously mentioned. The calculators of these patents include two conventional registers: the accumulator, or product register, and the counter, or quotient register. The two Friden patents mentioned earlier disclose a multiplying unit which includes a separate keyboard for the entry of multiplier values, a register for holding those values throughout a multiplication operation, and a program mechanism to control multiplying of the value standing in the keyboard by the value standing in the multiply register. The present invention adds a fourth, or squaring storage, register, and a mechanism whereby a factor inserted therein can be used as a multiplier to square the value standing in the keyboard.

It will be understood that the mechanism of the present invention could be used in an ordinary multiplying operation if the preferred program were interrupted at the end of the cycle in which the keyboard value is set into the auxiliary register. Thereafter a multiplicand value could be set into the keyboard by the operator, and the multiplication operation initiated in the usual way. The present invention is concerned with these primary objects and others which will become apparent from a perusal of the description of the preferred embodiment of the invention which is shown in the accompanying drawings, and in which:

FIG. 2 is a cross-sectional view showing portions of the keyboard, the actuating mechanism, the accumulator and counter registers, carriage shifting mechanism and part of the mechanism utilized to transfer a value into the auxiliary, or squaring storage, register;

FIG. 3 is a rear view of the machine, with covers removed, showing particularly the carriage shifting and register clearing mechanisms;

FIG. 4 is a cross-sectional plan view taken on a plane below the keyboard, showing details of some of the operating mechanisms;

FIG. 5 is a left side view of the front portion of the right side frame plate, with parts mounted thereon or associated therewith, including particularly the squaring storage, or auxiliary, register;

FIG. 6 is a front view of a portion of the auxiliary storage register, the view being taken substantially along the planes indicated by the lines 6—6 in FIG. 5;

FIG. 7 is a left side view of a portion of the automatic shifting mechanism, shown in plan view in FIG. 4;

FIG. 8 is a right side view of the mechanism shown in FIG. 7;

FIG. 9 is a right side view of the intermediate frame plate, showing particularly a portion of the regular multiplier control mechanism and some of the mechanisms associated with the operation of the squaring register;

FIG. 10 is a detail of the multiplier storage shifting mechanism;

FIG. 11 is a right side view of the left side intermediate frame plate, showing a portion of the mechanisms utilized to control the squaring operation;

FIG. 12 is a cross-sectional plan view showing in detail further portions of the control mechanism shown in FIG. 11, the view being taken along the horizontal plane indicated by the line 12—12 of FIG. 11;

FIG. 13 is a left side view of the mechanisms mounted on the left side of the intermediate left side frame, being, in effect, a reverse of the view of FIG. 11;

FIG. 14 is a detail showing a portion of the sign character control for the multiplying mechanism;

FIG. 15 is a detail of another portion of the sign character control for the multiplying mechanism;

FIG. 16 is a left side view of the squaring control mechanism and, in effect, is an enlarged detail of a portion of the mechanism shown in FIG. 19;

FIG. 17 is another detail of the control mechanism shown in FIG. 19;

FIG. 18 is still another portion of the squaring control mechanism shown in FIG. 19;

FIG. 19 is a left side view, with the cover partially removed, showing the squaring control mechanism of the present invention;

FIG. 20 is an oblique view of the squaring controls shown in FIG. 19;

FIG. 21 is a left side view of the squaring control clutch shown in FIG. 19;

FIG. 22 is a front view, partially in cross-section, of the clutch mechanism of FIG. 21, the view being taken along the planes indicated by lines 22—22 of FIG. 21;

FIG. 23 is a right side view of the control cam associated with the clutch of FIG. 21, the view being taken along the plane indicated by the line 23—23 of FIG. 22;

Figure 1:
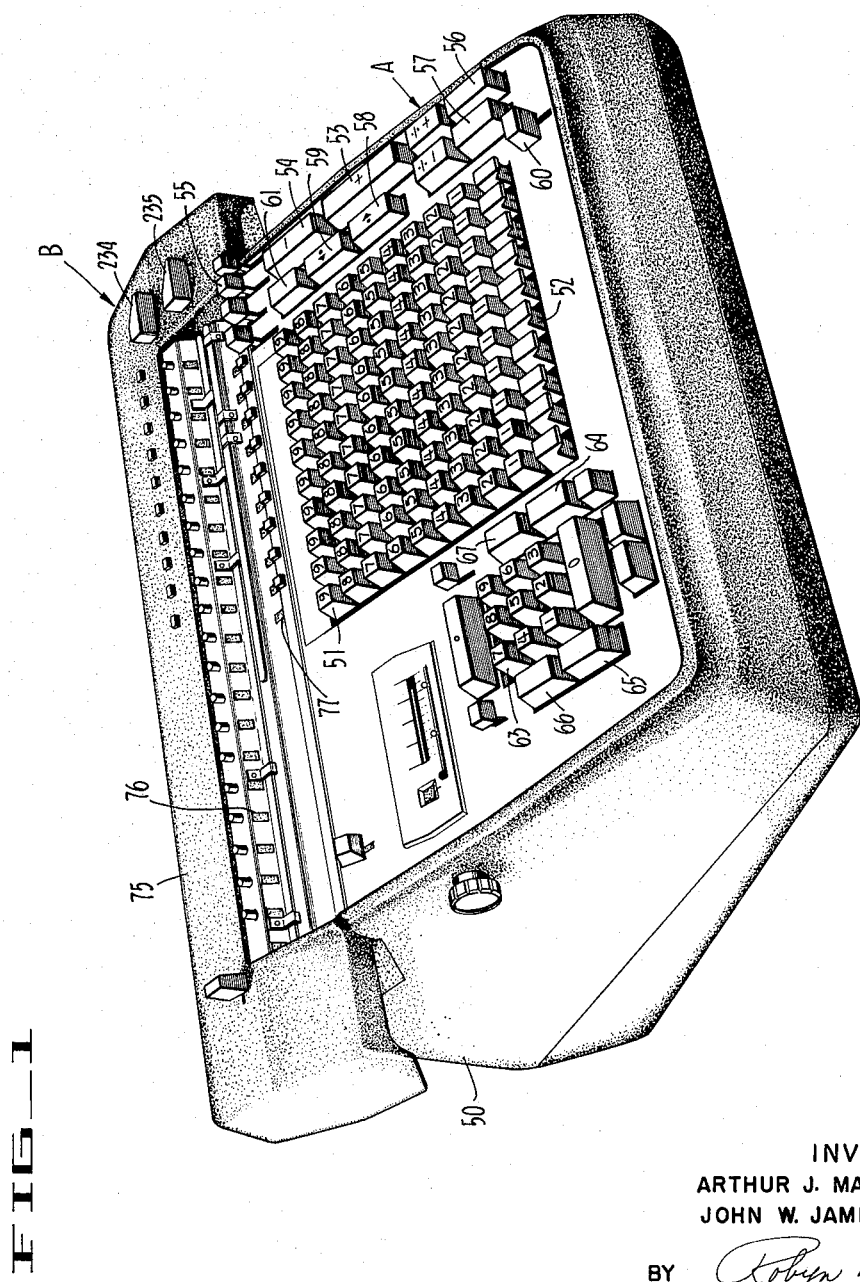
FIG. 1 is an oblique front view of the machine in which our invention is preferably incorporated.

FIGS. 24, 25 and 26 are left side views of another portion of the control mechanisms of FIGS. 21 to 23, inclusive, showing the control cam in its normal position, in its 90° position, and in its 180° position, respectively;

FIG. 27 is a detail of the operating means for controlling operation of the clutch which provides the transfer of the keyboard value into the squaring storage register;

FIG. 28 is a left side view of the cam shaft feed device, taken in the normal, or restore, condition;

FIG. 29 is a similar view of the mechanism of FIG. 28 showing the relationship of the parts in the operative, or feed, condition;

FIG. 30 is a right side view, in enlarged detail, of the squaring mechanism; and FIG. 31 is a front view of the mechanism shown in FIG. 30.

I. NORMAL MECHANISMS

The present invention is applied, for purposes of exemplification, to a calculating machine of the general type shown and described in the patent to Carl M. Friden, No. 2,229,889, issued January 28, 1941. This basic construction, in the preferred embodiment of the invention, has been modified and improved by the mechanism shown in the patents to Friden, Nos. 2,371,752 of March 20, 1945, and 2,399,917 of May 17, 1946, relating to the automatic multiplication mechanism for the basic machine; the Patent No. 3,090,554 of May 21, 1963 to Malavazos relating to controls for the multiplier mechanism; and the Patent No. 3,045,907 of July 24, 1962 of Malavazos relating to a back-transfer mechanism, part of which can be used in the entry of a value into the squaring storage register.

It will be understood, however, that the invention is not limited to incorporation in that particular machine as it can be incorporated in, or applied to, other calculating machines on the market, or we could use other selection and operating mechanisms. It is, therefore, to be understood that the machine shown in the accompanying drawings and described herein is for purposes of exemplification only and that the invention is not limited thereto.

(1) General arrangement (FIGS. 1 to 5, and 9)

It is customary for calculating machines (FIG. 1) to comprise a frame, or body portion, A upon which is mounted a register carriage B, the latter being ordinally shiftable in either direction with respect to the body portion A. The body portion A is provided with a cover 50 through which project the various keys, such as the value keys 51 and the ordinal clearing, or "0," keys 52 which constitute the main keyboard, and various control keys, such as a plus bar 53, a substraction key 54, an "add" key 55, a register clearing key 56, a keyboard clearing key 57, a right carriage shift key 58, a left carriage shift key 59, a back-transfer control key 60, and a dividend entry, or "tabulating" key 61. The machine used for exemplification of the present invention also normally includes a multiplication mechanism, including multiplier value keys 63 arranged as a separate keyboard on the lower left-hand corner of the machine, as described in the patents to Friden, Nos. 2,371,752 of March 20, 1945, or 2,399,917 of May 7, 1946. Associated with this multiplication mechanism is a plurality of multiplier control keys, such as a normal multiplication key 64, an accumulate multiply key 65, a negative multiply key 66, and a multiplication clear key 67.

A cover 75 of the carriage B (FIG. 1) contains a plurality of ordinally arranged windows 76 through which are visible the accumulator, or product register, dials 190 (FIG. 2); and another series of ordinally arranged windows 77 through which are visible the counter, or quotient, register dials 194.

The operating mechanism of the machine is, for the most part, supported upon a main frame which includes a base 85 (FIGS. 5 or 9), right side frame 86 (FIGS. 3 and 4), an intermediate frame plate 87 (FIGS. 4 and 9), and a left side frame 88 (FIGS. 2 and 4) lying to the left of the intermediate frame plate 87. The two side frames 87 and 88 are interconnected and braced by a plurality of crossbars 89, 90, 91, 92 and 96 (FIG. 2) near the rear of the machine. Similarly, the front portion of the machine is braced by a crossbar 93 (FIGS. 4, 5 and 9) which extends between the right frame 86 and the intermediate, or auxiliary, frame plate 87. In addition to these frame plates, the preferred machine has a left side control plate 94 (FIG. 19) at the extreme left-hand side of the machine, and an intermediate plate 95 (FIGS. 11 and 13) lying between the control plate 94 and the left frame plate 88. Most of the multiplication operating parts are mounted upon the left side of this frame and particularly (insofar as the present invention is concerned) upon the left side control plate 94 and the intermediate plate 95.

It should be mentioned that, for the sake of brevity, many mechanisms which are customary in machines of this kind, such as the division mechanism, power controls, and the like, are not described herein as they are not pertinent to the present invention. Those parts which are commonly found in machines of the type shown herein, or have been described in the various patents mentioned, and which only indirectly relate to the operation of this machine, will be described as briefly as possible; and those mechanisms which are directly related to the operation of the invention will be described more in detail. It will be understood, therefore, that we assume that our invention will be associated with a fully automatic calculating machine which has the usual features, such as those mentioned. However, for the sake of brevity, we will limit our description of known elements to those which directly or indirectly relate to the operation of our machine, or those mechanisms which must be modified in their operation in order to provide for the most satisfactory operation of the mechanism of our invention.

(2) Keyboard (FIG. 2)

Preferably, the keyboard of the present machine is that disclosed in FIGS. 3 to 5 of the Malavazos patent, No. 3,045,907. The keys 51 are mounted on key stems 100 (FIG. 2) which are slidably mounted in keyboard frame 101. The individual keys are resiliently biased to a raised position by means of compression springs 102 placed around the upper part of each key stem and seated against the top of the keyboard frame and the bottom of the key top. A depressed key is latched in an operative position by means of ordinal latch slide 103, slots of which encompass each key stem. Each key carries a cam nose 104 which, when a key is depressed, moves the latch slide rearwardly to release a depressed key of that order. When the key is depressed to its fully operative position, a notch 105 in the key stem registers with the latching slide, whereupon the latching slide snaps forwardly, under force of its spring 106, to latch the key in the depressed position. Each key stem carries a pin 107 riveted thereon adjacent its lower end, which pin sets the selection bars described in detail in Section 3, "Selection Mechanism," below.

An ordinal "0," or clearing, key 52 (FIG. 1) is aligned with each order of value keys 51. The stem of this key is provided with a cam nose similar to nose 104 of the value keys for forcing the latching slide 103 rearwardly to release any latched key of that order. The "0" key has no latching notch, so that it cannot be latched in its depressed position. In addition to ordinal clearing by a "0" key 52, the entire keyboard can be cleared by the keyboard clear key 57 (FIG. 1), the operation of which is not important to the present invention.

It is customary to provide machines of the type disclosed herein with an "add" key mechanism which is operative to clear the keyboard with each cycle of operation. Such a mechanism need not be described as it does not affect operation of the present invention. It may be noted, however, that such a mechanism is disabled in every multicycle operation, such as division or multiplication.

(3) Selection mechanism (FIG. 2)

The selection mechanism preferably is that shown in the Friden patent, No. 2,229,889, previously mentioned. It comprises a pair of V-notched bars 150 and 151 for each order of the keyboard—the bar 150 serving the "1" to "4" keys and the bar 151 the "5" to "9" keys. Each of these bars is mounted on a pair of struts 152, and each is provided with differentially sloping V-notches, or cam faces, 153 adapted to be engaged by the pin 107 of the respective value keys. Each bar is provided at its rear end with a perpendicularly extending yoke adapted to engage an annular notch in the collar of a respective selection gear 154 or 155. Each ordinal pair of these gears is mounted on a common selection, or square shaft, 156, all of whch are journalled in the crossbars 89, 90 and 92. It is obvious that the depression of the various value keys 51, through the action of the pin 107 on the associated cam face 153, will translate a selection bar 150 or 151 forwardly an amount determined by the key depressed, and such translation of the selection bar moves the related selection gear 154 or 155 axially along the square shaft a corresponding differential amount. When the various keys are latched in an operative, or lower, position, the key holds the corresponding selection bar in the adjusted position against the force of a light spring (not shown herein) which normally biases the bars to a "0," or inoperative, position.

(4) Actuating mechanism (FIG. 2)

The actuating mechanism is that of the well-known Thomas-type machine, such as described in the Friden and Malavazos patents above-mentioned. Briefly, it comprises an actuator drum 160 (FIG. 2) for each order of the machine. These drums are composed of teeth of differential lengths, so that the differential positioning of the selection gears 154 or 155 will place the respective gear in alignment with the number of teeth corresponding to the value of the key depressed. In the preferred construction, a pair of actuator drums 160 is mounted on a common shaft 161, so as to serve a pair of orders. These shafts and the accumulator drums are driven from a common drive shaft 162 through a pair of miter gears 163. It is obvious that the rotation of the main drive shaft 162 will drive all of the actuator drums 160, thereby imparting increments of rotational movement to the ordinal square shafts 156, depending upon the position of one or the other of the coordinal selection gears 154 or 155.

This differential rotational movement is used to rotate the accumulator dials through the medium of a digitation control spool 164 slidably mounted on the rear end of the square shaft. Each of these spools carries an additive gear 165 and a subtractive gear 166, both of which are adapted to register with a coordinal accumulator gear 192. The digitation control spool 164, and hence the additive and subtractive gears 165 and 166, are positioned by means of a bail 167 which is fixed to a digitation control shaft 168, as by means of arms 169 (only one of which is shown herein). By means of controls not here pertinent, the shaft 168 can be rocked to position the digitation control sleeve 164 to enter a value determined by the setting of the selection mechanism additively or subtractively into the accumulator dials, at the will of the operator. The digitation control shaft 168 is also rocked automatically in multiplication operations, as will be described hereafter in Subsection 11, "Multiplying Mechanism."

(5) Accumulator mechanism (FIG. 2)

The accumulator register is mounted in the shiftable carriage B. The framework of the carriage, as best shown in FIG. 2, comprises a frame bar 180 and a front rail 181 held in properly spaced relationship by a pair of end plates 182 (only one of which is shown herein). In the preferred form of the machine, the carriage B is hinged on a bar 183 mounted in the side frames of the machine, the bearings in the end plates allowing axial motion as well as rotary. The carriage rail 181 rides upon suitable bearings 184 which are mounted on the crossbar 96. This construction allows for easy lateral movement of the carriage B and also permits it to be lifted for adjustment of the machine.

The product register comprises a series of ordinal dials 190, each of which is mounted on the upper end of a dial shaft 191. The dial shafts are journalled in the carriage frame bar 180, the dials lying above the frame bar 180 and being viewable through windows 76 in the carriage cover 75 (FIG. 1). The accumulator gear 192 is mounted on the lower end of each dial shaft 191, below the bottom of the frame bar, which gear is adapted to be driven by either the positive gear 165 or the subtractive gear 166, already mentioned.

It will be understood that the accumulator register dials 190 are provided with tens-transfer mechanisms, which mechanisms preferably are of the well-known construction shown in the Friden patents hereinbefore mentioned. Since the tens-transfer mechanism is not used to control any part of the program or mechanism of the present invention, it will not be described. Likewise, it will be understood that the carriage B carries a plurality of ordinally arranged counter dials 194 which are viewable through window 77 in the carriage cover 50 (FIG. 1). Again, the counter plays no part in the present invention, so that its construction and operation by a well-known actuator will not be described.

(6) Clutch and drive mechanism (FIG. 5)

In the preferred embodiment of our machine, the various mechanisms are driven by an electric motor (not shown) which drives a clutch (likewise not shown)

mounted on the drive shaft 162. This type of clutch and drive is so well known that it will not be described, but reference can be had to the Friden and Malavazos patents heretofore mentioned. It can be noted, however, that it is customary to control operation of the motor by means of a switch control link 210 (FIG. 5) and to control operation of the clutch by means of a control lever 208. The link 210 and lever 208 are connected by means of a long pin 209, extending through an aperture the right side frame plate 86. It is important to notice, in connection with this mechanism, that the operation of either the clutch or the switch will simultaneously operate the other, and means will be described later to provide for simultaneous operation of both mechanisms by operation of the multiplier control keys (see Subsection 11).

(7) *Carriage shifting mechanism* (FIGS. 2, 3 and 4)

It has previously been mentioned that the carriage B (FIG. 1) is shiftable in either direction with respect to the frame, or body, A of the machine. This shifting can be controlled by power from the operation of the manually operated shift keys 58 and 59 (FIG. 1) and also in certain automatic operations, such as multiplication, as will be described hereinafter. The mechanism for shifting the carriage is shown particularly in FIGS. 2, 3 and 4, and is essentially that shown and described in the patent to Carl M. Friden et al., No. 2,380,642, issued July 31, 1945, as modified by the clutch mechanism shown in the patent to Matthew, No. 2,679,916, issued June 1, 1954. This mechanism has been so often described that it will not be described in detail. It is believed sufficient to note that a leftward shifting of the carriage is secured by operation of a left shift clutch 220 (FIG. 4) and right shifting is controlled through a right shift clutch 221 (also shown in FIG. 2). Both are operated through the gearing shown to rotate a shift plate 222 (FIGS. 2, 3 and 4), pins 223 of which engage notches 224 in a shift rack 225, mounted on the carriage frame bar 180. By means of this mechanism, a shift of one ordinal space in either direction is accomplished in each cycle of machine operation. If further description of this mechanism is desirable, reference is made to the Malavazos patent, No. 3,045,907, wherein this mechanism is described in Columns 22 to 24, inclusive.

(8) *Register clearing mechanism* (FIGS. 2, 3 and 4)

The well-known means for clearing the accumulator dials 190 and the counter dials 194, in the patents mentioned, is illustrated in FIG. 2. Such mechanisms comprise a mutilated clearing gear 230 rigidly mounted on each of the accumulator shafts 191, and a similar mutilated clearing gear 231 mounted on the shaft supporting each counter dial 194. Preferably these mutilated gears are staggered on their respective shafts, as shown, in order to keep the ordinal spacing of the machine at the smallest possible distance. Associated with the clearing, or mutilated, gears 230 and 231 are clearing racks 232 and 233 respectively. The respective dials are returned to their "0," or clear, positions by longitudinal translation of the racks 232 or 233, respectively, as shown and described in detail in the patent to Friden, No. 2,229,889 already mentioned. These racks can be actuated manually by means of knobs 234 and 235, respectively (FIG. 1); or they (both or either) can be operated by power, automatically, in certain operations (not of which is multiplication as will be described hereafter) by a mechanism which will now be described.

The power-operated clearing mechanism comprises a bar 240 slidably mounted on the rear carriage frame bar (see FIGS. 2 and 3). Preferably the power clearing bar 240 is mounted by the usual pin-and-slot mounting, which includes slots 241 in the power bar embracing pins 242 mounted in the carriage frame bar 180. It is usual to bias the power clearing bar to its left-hand (to the right in FIG. 3), or inoperative, position by a suitable tension spring (not shown). The right end of the power bar 240 carries an integral bracket (not shown) upon which is riveted, or otherwise rigidly secured, a pair of pins that respectively engage interponents rigidly connected to the clearing knobs 234 and 235.

The power clearing bar 240 is operated, i.e., translated to the right (to the left in FIG. 3), against the tension of its spring by means of an interponent rack 243 (FIG. 3) that is rigidly secured thereto. Preferably this rack is provided with ordinally spaced shoulders 244, as shown. These shoulders 244 are adapted to be engaged by an ear 250 formed on the right end of a link 251. This link 251 is guided by a pin 252 on the rear bearing plate 92 which is embraced by a cam slot 253, shown in FIG. 3; and its left end is supported by a pivotal mounting on a cam follower arm 254 (see also FIG. 4). The follower arm 254 is pivotally mounted on a stub shaft 255 that is mounted between the rear frame plate 92 and a bearing bracket 256 (FIG. 4) mounted on the rear thereof by any suitable means, such as spacer studs 257. The follower arm is usually biased to the left (to the right in FIG. 3) to an inoperative position by a suitable spring 258 and is provided with a follower roller 259 that engages the periphery of a clear cam 265. The clear cam 265 is rigidly mounted on a short shaft 266 journalled in the rear frame plate 92 and the bearing bracket 256. The forward end of this shaft carries a clutch disk 267 (FIG. 4) which is adapted to co-operate with a well-known clutch driver 268, preferably of the type shown in the patent to Matthew, No. 2,679,916 previously mentioned.

In our preferred form of the present invention, we mount the clutch driver 268 (FIG. 4) on the leftmost actuator shaft 161 and control its operation by means of a control rod 269 immediately adjacent thereto. This clutch control rod is biased to a forward, inoperative position by means of a suitable spring 270. It is customary in the machine with which our invention is preferably associated, to form the control rod 269 of two telescoping members biased to an extended position, as shown in FIG. 4, so that normal operation of the forward portion of the bar can be prevented from operating the clear clutch in certain operations not here pertinent. Insofar as the present invention is concerned, operation of the clutch control rod 269 is secured by a pusher link 275 having a shoulder 276 (see FIG. 9) normally engaging the forward end of the rod 269, the pusher link being biased downwardly into engagement with the rod by a suitable spring 274. The forward end of the pusher link 275 (left end in FIG. 9) is pivotally connected to a link 279 and to a supporting arm 277 that is rotatably mounted on shaft 278, as shown. The link 279, in turn, is pivotally mounted on an arm 280 by any suitable means. The arm 280 is rigidly mounted on an initiating shaft 300, the operation of which will be described in connection with the operation of the multiplier control keys in Subsection 11, "multiplying mechanism," below. Thus, the rocking of the shaft 300 to initiate a multiplying program operation directly, through links 279 and 275 and clutch control rod 269, causes engagement of the clearing clutch even before the shaft has turned sufficiently to engage the clutch and close the motor switch. Hence the clearing mechanism is operated during the first machine cycle of operation.

Obviously it is necessary to clear the registers once and immediately disable the clearing mechanism, as continued operation of the clearing mechanism would cause considerable trouble. Such disabling of the clearing mechanism is readily secured by well-known means comprising a cam 285 (FIGS. 4 and 9) that is rigidly mounted on an auxiliary drive shaft 286. The periphery of the cam engages a pin 287 riveted on the pusher link 275, whereby the rotation of the shaft 286, at approximately the midpoint of the cycle, will lift the pusher link 275 to disengage it from the forward end of the clutch control rod 269. Thereupon the spring 270 snaps the rod forwardly and, as the link 275 is lowered later in the cycle, it comes to rest on the upper surface of the rod 269, forwardly of the shoulder and thereafter will have no effect upon the operation of the clearing mechanism. The auxiliary drive shaft 286 is, as shown in FIG. 4, connected to the main drive shaft 162 by a 1:1 gearing which may comprise a miter gear 288 meshing with the leftmost miter gear 163 on the drive shaft 162. The gear 288 is mounted on the upper end of a drive shaft 289 suitably journalled in a pair of bearing brackets 290 and 291. A pair of co-operating miter gears 292 and 293, the former affixed to the shaft 289 and the latter to the shaft 286, completes the gear train to the shaft 286. Thus the shaft 286 rotates a full revolution synchronously with the operation of the main drive shaft 162. This construction enables the operation of the clearing mechanism early in the clearing cycle of operation (in which condition it is locked by an interlock not pertient to the present invention and, therefore, not shown); and the control is automatically disabled at about the mid-point of the cycle, so that only one clearing cycle can take place.

*(9) Automatic shifting mechanism (FIGS. 4, 5, 7 and 8)*

It is convenient, at least in the machine herein shown for purposes of exemplification, to initiate all operations which include an initial left shift of the register carriage B to the extreme left-hand position by a single power-operated mechanism. For this purpose we prefer to use the mechanism shown and described in the patent to Machado, No. 2,650,761, issued September 1, 1953, side views of which are illustrated in FIGS. 7 and 8. The operation of this mechanism is controlled by the rocking of a shaft 300 (see also FIGS. 5 and 9) suitably journalled in the machine. This shaft is rocked (clockwise in FIGS. 8 and 9, and counter-clockwise in FIGS. 5 and 7) by any one of the multiplier control keys, as will hereinafter be explained in Subsection 11, as well as other control keys not here pertinent. The rocking of this shaft (counter-clockwise in FIG. 5) is effective to close the motor control switch and cause the engagement of the clutch to initiate machine operation. It is customary to mount a bellcrank 301 on the right end of this shaft 300. A pin 302 on one arm of the bellcrank engages the stem, or tail, of a Y-shaped bellcrank 303 pivotally mounted on shaft 278. One arm of the bellcrank 303 engages pin 209 that connects switch control link 210 to the clutch control lever 208, so that the rocking of shaft 300 (counter-clockwise in FIG. 5) rocks bellcrank 303 (clockwise in this figure) to pull link 210 forwardly to close the motor switch and engage the clutch. The shaft 300 (and parts mounted thereon) is biased to an inoperative position by means of a spring 304 tensioned between the other arm of bellcrank 301 and a crossbar 305. The rocking of this shaft 300 is also effective to operate the programming mechanism here under discussion by means of the mechanism shown in FIGS. 7 and 8.

The preferred form of automatic shifting mechanism comprises bellcrank 310 rigidly mounted on the shaft 300 in a plane about midway between the intermediate and right side frames 87 and 86 (see FIG. 4). A control link 311 is customarily mounted on the upper end of the bellcrank 310 by a pin-and-slot connection 312. The rear end of the link 311 is pivotally connected to one arm of a bellcrank 313 that forms a closed cam follower mounted on an eccentric disk 314 rigidly mounted on the auxiliary drive shaft 286. The other arm of the bellcrank is formed as a hook, or shoulder, 315 (see FIG. 8) adapted to engage a pin 316 riveted to, or otherwise rigidly mounted on, a control lever 317. This lever is rigidly mounted on the transverse shaft 278 journalled in the right side frame 86 and intermediate frame plate 87 (FIG. 4). It will be evident that the eccentrically mounted bellcrank 313 will be operated at all times that the machine is in operation. However, the bellcrank 313 is so positioned angularly in ordinary conditions that the hook 315 reciprocates in a path in which it does not come into engagement with pin 316. However, when the bellcrank 313 is rocked from the rocking of shaft 300 (both of which rock clockwise in FIG. 8 and counter-clockwise in FIG. 7), the hook 315 engages pin 316 at the extremity of its forward stroke, which occurs about the mid-point of a cycle. Thereupon the eccentric rocks the arm 317 and shaft 278 (clockwise in FIG. 8 and counter-clockwise in FIG. 7). At this time the arm 317 is latched by a latch arm 318, a shoulder of which engages a pin 319 on the arm 317. This latch remains effective until it is released by the return of the first-mentioned bellcrank 300 to the normal position shown in these figures, at which time a pin 320 on bellcrank 310 lifts the free end of the latch 318 to unlatch the control lever 317.

The shaft 278, the rocking of which has just been described, has an arm 325 rigidly secured thereon (see particularly FIGS. 4 and 7). The upper and free end of this arm pivotally supports the forward end of a pusher link 326, the rear end of which is biased downwardly by a spring 327 and is formed with a shoulder 328. The shoulder 328 engages a pin 329 that is riveted on an arm 330 formed on the left end of a sleeve 331 (see FIG. 4) which is pivotally mounted on a crossshaft 332. The right end of the sleeve 331 carries an arm 333 on which is secured a long pin 334 that engages the forward end of the left shift control rod 335 normally biased forwardly by a spring 336 surrounding the forward portion of the rod. Thus, the rocking of the arm 317 and shaft 278 is effective, in the latter half of the first cycle of operation and during the operation of the clearing mechanism, to set the clutch driver of the left shift clutch 220 to its operative position. It can be mentioned that this clutch is ineffective to initiate a shifting operation until the start of the succeeding cycle of operation. The clutch will be held in its operative position so long as the shaft 278 is rocked and the pusher link 326 is held downwardly by the bias of its spring 327. The shaft 278 will be released only at the end of a multiplication operation as far as the present invention is concerned, but a means is provided for lifting the pusher link 326 as soon as the carriage reaches the extreme left-hand position, as will now be described.

*(10) Shift terminating mechanism (FIGS. 3, 4, 5, 7 and 8)*

It is customary in the machine described to provide a means for terminating an automatic shift in either extreme position, but as only the left shifting mechanism is involved in the pre-multiplication programming, it only need be described herein. It is conventional in most automatic multiplication mechanisms to shift the carriage to an extreme left-hand position as a preliminary program to multiplication, so multiplication can begin with the lowest order of the multiplier. The termination of such a continuous left shift is controlled by an attempted overshifting of the carriage beyond the terminal position, preferably by the mechanism which is best shown in FIGS. 3 and 4. It is seen in FIG. 3 that the extreme right-hand notch 224 (to the extreme left in this figure) of the shift rack 225 is formed in an override pawl 340. This pawl 340 is pivotally mounted on the rack 225, as by means of a stud 341, and is biased into an operative position by a spring 342. A nose on the right end of the pawl (to the left in FIG. 3), when the carriage B is in the extreme left-hand position shown in FIGS. 1 and 3, overlies an ear 343 (see also FIG. 4) formed at the upper end of a slide 344. The slide is mounted on the rear bearing plate, or crossbar, 92 by suitable means, such as pin-and-slot connections 345. The lower end of the slide overlies the rearwardly extending and horizontal arm of a bellcrank 346 that is pivotally mounted on the computation control shaft 168. The lower arm of this bellcrank is connected to a forwardly extending link 347 (FIGS. 4 and 5), the forward end of which is connected to the upwardly extending right leg of a bail 348. The left leg of the bail (as best shown in FIGS. 4 and 7) has a laterally extending ear 349 that underlies the pusher link 326 so that the rocking of the bail is effective to lift the link away from its co-operating pin 329. When this happens, the sleeves 331 is released from control by the link 326; and the spring 336 on the left shift control rod is thereupon effective to return the rod and parts controlled thereby to their normal and inoperative position. The operation of the bail 348, therefore, disables the effectiveness of the shift programming mechanism, for the pusher link 326 will be riding upon pin 329 instead of engaging it. Thus, even though the automatic left shift mechanism is locked in its effective position, it can no longer control a shifting operation. It can be mentioned at this point that the rocking of the bail 348 is also effective to initiate operation of the multiplier mechanism, as will be described hereafter.

*(11) Multiplying mechanism (FIGS. 1, 5, 9, 10, 11, 13 to 16, and 18)*

It has already been mentioned that the machine with which our invention is preferably associated utilizes a well-known multiplier mechanism which includes the ten multiplier keys 63 (FIG. 1) and means by which values inserted manually into the keyboard are set in a series of multiplier segments carried by a shiftable multiplier control carriage (not shown). It has also been mentioned that the present invention is designed to supplement such a multiplication mechanism to provide for multiplication from a second, or auxiliary, multiplier register, and particularly to square a value set in the keyboard. The multiplying mechanism, therefore, need not be described, but it should be mentioned that during the insertion of values into the well-known multiplier storage register the multiplier carriage is shifted ordinally to the left, a single ordinal step with each digital value registered by depression of a multiplier value key 63; that upon initiation of a multiplication operation by depression of one of the keys 64, 65 or 66, the lowest order multiplier segment is fed back toward a "0" position by a cyclically operated feed mechanism; that when the operative segment reaches a "0" position, it operates a shift-initiating arm 356 (FIG. 11); and that thereupon the register carriage B and the multiplier carriage are shifted one ordinal position to the right, the control of the shift of the multiplier carriage being effected through a lever assembly 357 (FIG. 10). Although these mechanisms must be disabled in a squaring operation, or a multiplication operation using the auxiliary multiplier register of the present invention, it is believed unnecessary to describe them here for they are adequately described in the Friden patents Nos. 2,371,752 and 2,399,917 to which reference has already been made.

It perhaps should be further mentioned that the multiplier carriage is escaped a single order to the left from the home, or inoperative, position with the insertion of each digit of a multiplier value. The patent to Malavazos et al., No. 3,066,864, issued December 4, 1962 (which describes an automatic decimal point mechanism) has means for representing the ordinal position of the multiplier carriage (see FIGS. 11, 14 and 18 of the patent and Columns 27 and 28 of the specification thereof). In the present invention, we desire to utilize this mechanism to determine whether a multiplication operation initiated by a multiplier key 64, 65 or 66, shall be effective to initiate the multiplication under the control of the previously known multiplication mechanism, or from the squaring control register of the present invention. This can be automatically effected by sensing whether the multiplier carriage is in its home, or inoperative, position, in which case no values are set into the multiplier mechanism; or whether it is in an operative ordinal position, which indicates at least one multiplier value has been inserted therein. This mechanism is utilized in the present invention to automatically determine which multiplier mechanism is to be effective— if even a single value has been inserted into the multiplier mechanism and the multiplier carriage is moved only one ordinal space from its home position, then multiplication by the usual means is indicated. However, if the carriage is in its home position, that fact is indicative that no values have been inserted in the regular multiplier mechanism and then the mechanism of the present invention is operated to square the value standing in the keyboard.

The mechanism which is shown and described in the Malavazos et al. patent just mentioned, includes a link 358 (FIG. 13), which corresponds to link 826, FIGS. 14 and 18 of the patent. The rear end of this link is pivotally connected to an arm 359 mounted on the frame of the machine, the free end of which is formed as a gear segment. The teeth of this gear segment mesh with corresponding teeth on a second gear segment 360 which is rigidly mounted on a shaft 361. At its left-hand end, the shaft 361 carries a large gear segment 362 (FIG. 16) which corresponds to the segment 840 described in Column 27 of the Malavazos et al. patent and shown in FIG. 11 thereof. The position of this gear segment will be utilized to determine whether the usual multiplier mechanism or the squaring mechanism is to be operated. Other than this sensing operation, the automatic decimal point mechanism of the Malavazos et al. patent is not pertinent to the present invention, and will, therefore, not be further described.

We prefer to use, in the present invention, the multiplication control mechanism shown and described in detail in the patent of Malavazos No. 3,090,554, issued May 21, 1963. It is, therefore, believed unnecessary to describe in detail the mechanism by means of which the desired control is effected. In such a mechanism, operation of the multiply key 64 is effective to provide positive multiplication coupled with the clearing of the registers and a preliminary shifting of the carriage B to a left-hand position; the operation of the cumulative multiplier key 65 is effective to initiate a positive multiplication with the preliminary shift of the carriage but without clearing the keyboard; and operation of the negative multiply key 66 is effective to operate subtractively after the preliminary shift in order to subtract one product from another, which operation is also coupled with the disabling of the register clearing mechanism. The normal multiplication operation is controlled by a programming mechanism comprising a clutch and cam cluster 363 (FIG. 16), the operation of which is initiated by a clutch control arm 364. This cam cluster remains disabled in the shifting phase of a squaring operation and becomes operative only after the keyboard value is set into the auxiliary squaring register and the controls for normal multiplication are disabled. Since it operates as described in said Malavazos patent, its operation need not be described here. However, it will be recognized that the present invention utilizes a control mechanism very similar to that of this patent, and uses many of the mechanisms there described. Due to the fact that to describe these elements in detail would constitute, in effect, a duplication of these mechanisms as described in Columns 20 to 38 of that patent, reference is made thereto for a full description thereof.

It perhaps should be noted that the depression of the multiply key 64 (FIG. 9) rocks a rocker arm 370. A pin on the lower arm of rocker 370 engages an arm 371 rigidly secured to the initiating shaft 300. Similarly, the depression of either of multiplier control key 65 or 66, is effective to rock shaft 300: the accumulator multiply key 65 rocks lever 372 (FIG. 18), and the negative multiply key 66 rocks lever 373. Rocking of either of these levers (clockwise in FIG. 18) rocks a control arm 374, a pin 375 of which underlies both levers 372 and 373. A link 376 suspended from lever 374 engages a bellcrank 377 that is mounted on the left end of the initiating shaft 300. Thus, depression of any of the three multiplier control keys is effective to rock shaft 300 (counter-clockwise in FIGS. 5 and 18, or clockwise in FIG. 9) to initiate a machine operation, which may or may not include clearing of the register, but will always include a shift or attempted shift of the carriage to the extreme left-hand position.

The rocking of the interponent lever 374 (FIG. 18) is also effective to disable the clearing mechanism. This can be accomplished by means of a bellcrank 405 which is pivotally mounted on the left side control plate 94. The slotted end of the forwardly extending leg of bellcrank 405 engages a pin 406 on the link 376, so that the bellcrank is rocked (clockwise in FIG. 18) upon the depression of the interponent lever 374 and link 376. The lower leg of bellcrank 405 engages a pin 407 that is riveted to, or otherwise rigidly secured on, an arm 408 which is rigidly mounted on a shaft 409. The arm 408 and shaft 409 are, therefore, rocked rearwardly (counter-clockwise in FIG. 18) upon depression of either the accumulator multiply key 65 or the negative multiply key 66. The shaft 409 extends from the left side control plate 94 to the intermediate frame plate 87 (see FIG. 9). On its right end the shaft 409 carries a bellcrank 410 rigidly mounted thereon. A pin 411 carried by the bellcrank 410 engages the upper edge of a rocker 412 which is pivotally mounted on shaft 278. The rearward end of the rocker 412 is formed as a leftwardly extending ear 413 which underlies and engages the lower edge of the clear clutch control link 275. Thus, the rocking of shaft 409 (counter-clockwise in FIG. 18 and clockwise in FIG. 9) is effective to rock the bellcrank 410 and rocker 412 to lift link 275 from engagement with the forward end of clear clutch control bar 269. As the lifting of link 275 occurs simultaneously with the rocking of shaft 300, which normally would initiate operation of the clearing clutch simultaneously with the initiation of operation, the link 275 is lifted above the bar 269, so that it will have no effect on the bar 269 and, therefore, the clearing mechanism is disabled.

The operation of the override mechanism including the bail 348 (FIG. 5), which is occasioned by the attempted shift of the carriage beyond the extreme left-hand position, is effective to initiate the multiplication operation. This is secured by a crank 385 (FIG. 5) which is pivotally mounted on the right-hand side frame 86 by any suitable means, such as stud 386. A slot formed in the upper edge of the bellcrank 385 engages a pin 387 carried by a tail 388 of the right-hand leg of the bail 348. A link 389 connects the bellcrank 385 to an arm 390 that is rigidly mounted on a shaft 391. The shaft 391 extends across the machine and at its left end carries an arm 392 (FIG. 18) which is rigidly secured thereon. The lower end of this arm 392 is formed with a laterally extending ear 393, which ear, with the stem of the arm 392, forms a guide slot for an initiating link 394. Normally, the link 394 is held in a lower position, as shown in FIG. 18, so that the rocking of arm 392 will not cause translation of the link, and thus will not initiate a multiplication operation on normal operations of the override mechanism. However, when the shaft 300 has been rocked to an initiating position, the bellcrank 377 is rocked (counter-clockwise in FIG. 18). In that event a spring 395, tensioned between the forward end of the bellcrank 377 and the link 394, lifts the forward end of the link so that a shoulder 396 adjacent the forward end thereof registers with ear 393. Normally, of course, an ear 397 on the bellcrank 377, engages a pin 398 on the link and holds the forward end of the link depressed, as shown in FIG. 18.

The Malavazos Patent No. 3,090,554 heretofore mentioned discloses (Column 35 and FIGS. 24 and 32 thereof) the multiplier shift control mechanism which is shown in the drawings of the instant application. This mechanism comprises a shift control cam 775 (FIG. 13) which is carried by a quill shaft 776 driven by the half-cycle multiplier programming clutch 631, the operation of which is described in that patent. The cam, and quill shaft 776 on which it is mounted, are rotatably mounted on the main drive shaft 162 already mentioned. The clutch 631 (as shown in FIG. 18) which controls the operation of cam 775 is engaged in the latter part of a cycle and, when operated, a lobe 777 of the cam 775 rocks a cam follower arm 778 to the clockwise position shown in FIG. 13 (it being held in that position in other operations and before the actual start of a multiplication operation by mechanism not here pertinent). The arm 778 is rigidly mounted on a shift control shaft 609. When so rocked, the shaft 609 enables the carriage B shifting mechanism and, in normal multiplication, the multiplier storage carriage also. However, in a squaring operation, the multiplier carriage shift is not used and hence is disabled by the mechanism shown in FIG. 10. In the present invention, the arm 778 is formed as a bellcrank with a rearwardly extending leg 780 which overlies a pin 766 on the upper portion of a bellcrank 765, the operation of which will be described in Section II, Subsection 5 (d) entitled "Enable Operation of the Feed Bar."

It is also explained in the Malavazos patent just mentioned (in which FIGS. 32 to 34 correspond to FIGS. 13, 14 and 15 of this application) that a sign character control mechanism is normally set for a subtractive operation, and this condition is automatically changed in most multiplication operations. The mechanism is conditioned for additive operation by a rocking of an arm 785 pivotally mounted on a shaft 786 (FIG. 13). This arm 785 is provided with a pin 787 which is engaged by a hook on the upper end of a substantially vertical link 788. The lower end of the link 788 is pivotally connected to a lever 789 that is pinned to, or otherwise rigidly secured on, a shaft 790. This shaft is rocked at the start of the multiplication operation (counter-clockwise in FIG. 13) by the mechanism described in the Malavazos patent. When so rocked, the link 788 is pulled downwardly and, if in the additive position shown, it depresses the lever 785 to establish an additive series of operations. If rocked forwardly by the T-lever 791, the hook on the end of link 788 has released the pin 787 and the arm 785 stays in its subtractive position shown. The T-lever 791 is normally in the additive position shown, but is rocked forwardly (clockwise in this figure) by depression of the subtractive multiply key 66, as described in that patent.

It is also important to note that the shaft 790 is rocked at the start of the multiplication operation, in the present invention, by means of the mechanism fully shown and described in the Malavazos patent. In the present invention, the lever 789 is formed as a rocker with a forwardly extending arm 792 which also overlies the pin 766 of bellcrank 765.

The quill shaft 776 also carries a subtractive control cam 861 and an additive control cam 862 (FIG. 15), which likewise are rotated approximately 180° upon the operation of the half-cycle clutch. Associated with the subtractive control cam 861 is a bellcrank follower 863, the forwardly extending (right) portion of which is bifurcated to form a yoke which encompasses the cam 861. Similarly, associated with the additive control cam 862 is an additive bellcrank follower 864, the forward portion of which is likewise bifurcated to form a yoke encompassing the cam 862. Both follower bellcranks are mounted in adjacent relationship on shaft 865. It is apparent that, as the cams 861, 862 are rotated to the half-cycle position, the two followers are rocked in opposite directions, somewhat in the nature of operation of a pair of scissors, and in the last half-cycle, are rocked back to the normal position shown in FIG. 15.

Both of the cam followers are provided in the extremity of their upper legs with slots adapted to engage a pin 866, the slot of subtractive cam follower 863 opening upwardly and the slot in the additive cam follower 864 opening downwardly, as shown in this figure. Pin 866 is carried by an offset link 867 (FIG. 14). The rear (left) end of link 867 is pivotally connected to an arm 868 that is rigidly mounted on the digitation control shaft 168. Thus, the rocking of the two followers, depending upon the position of pin 866 in the slot of one or the other, will rock the arm 868 and hence shaft 168 in one direction or the other.

The position of pin 866 is controlled by the position of arm 785. The forward end of arm 785 carries a roller 793 (FIGS. 13 and 14). This roller lies within a slot formed in an interponent 875, the forward end of which is pivotally connected to an arm 876 which is allowed to rock (counter-clockwise in these figures) by the rotation of a cam 860 to its half-cycle position. This cam is also mounted on the quill shaft 776, and hence is rotated to its half-cycle position by the operation of the half-cycle control clutch 631 (FIG. 18). The interponent 875 has a pair of opposed slots adapted to engage one or the other of a pair of pins 877 and 878 mounted at two angles of a triangular plate 879. This plate is pivotally mounted on the adjacent frame plate by any suitable means, such as pin 880. A pin 881 on the third corner of the triangular plate 879 engages a slot formed in the free end of the offset link 867. It is obvious that the rocking of the arm 785 will rock the interponent 875 to cause it to engage either pin 877 or 878. Thereafter the rocking of arm 876 (clockwise in FIGS. 13 and 14) will pull the plate 879 either clockwise or counter-clockwise—and consequently will raise or lower pin 866, and hence control the direction of translation of the offset link 867 when it is operated by either the follower 863 or 864.

If a more detailed description is desired of this multiplier mechanism, reference is made to the Malavazos patent, No. 3,090,554, already mentioned, where all of these elements are discussed in detail.

II. SQUARING MECHANISM

The present invention is designed to square a value set into the main keyboard keys 51, i.e., multiply that value by itself. The mechanism of this invention is designed to provide this multiplication by the method of repeated addition (or repeated subtraction in negative multiplying) even though the main multiplier unit is adapted for multiplication on the "short-cut" principle. Thus, while we use the multiplier control mechanism shown in FIG. 24 of the Malavazos patent, No. 3,090,554 (referring particularly to the clutch and cam cluster identified in that patent by the reference character 701 and succeeding numbers), the controls in the present invention are somewhat simpler. It will be understood that in the present invention it is only necessary to set the sign character of the operation from the depression of the multiplier control key, as the squaring operation of this invention will operate by repeated addition or repeated subtraction, and not by a "short-cut" method. In our preferred embodiment, we use an auxiliary clutch and cam cluster to program the steps of a squaring operation which includes two major programs:

(A) setting the keyboard value into a series of ordinally arranged multiplier storage wheels lying in front of the keyboard, which is accomplished by a portion of the mechanism shown in Malavazos Patent No. 3,045,907, issued July 24, 1962; and (B) controlling the program of multiplication in a manner similar to that shown in the Malavazos Patent No. 3,090,554.

This auxiliary clutch and the regular multiplication clutch are so interlocked that the cam cluster for squaring can be operative only when the multiply register carriage is in its home position; and, in that event, the clutch and cam cluster of this last-mentioned patent is locked against operation. Thus, in the preferred form of our invention, the squaring mechanism is disabled if a value stands in the normal multiplier storage register. On the other hand, if no value stands in the usual multiplier storage register, then the depression of any of the multiplier control keys is effective to initiate a program in which the keyboard value is set into a separate squaring storage register; and, as part of the same continuous series of opertions, the value now standing in the squaring register controls the repeated addition or repeated subtraction of the value standing in the keyboard.

The depression of a multiplier control key 64, 65 or 66, in our preferred construction, invariably initiates the same preparatory program of operations regardless of whether the operation is conventional multiplication or the operation of our auxiliary multiplying mechanism (which, for the sake of simplicity, will usually be referred to as "squaring"). This preparatory program comprises the operation of the clearing clutch control link 275 (FIG. 9), the initiation of a continuous left shift program through the mechanism shown particularly in FIGS. 7 and 8, and the initiation of machine operation through the operation of the switch link 210 and clutch control arm 208 (FIG. 5). All of these operations follow automatically from the rocking of the initiating shaft 300 which is rocked (clockwise in FIG. 9 and counter-clockwise in FIG. 5) by depression of these multiplier control keys. When the carriage has shifted to the extreme left-hand position, or in the second cycle of operation if the carriage is in that position when the key is depressed, the override mechanism described in connection with FIGS. 3, 4 and 5 is operated to rock shaft 391 (clockwise in FIGS. 5, 16 and 18). It will be understood that this series of operation occurs regardless of whether the machine is operating to multiply a value in the keyboard by a value standing in the usual multiplier storage register, or whether it is operating to multiply a value in the main keyboard by value standing in an auxiliary, or "squaring" register. In other words, the operation of the shaft 391, arm 392 and initiating link 394 is the same in both types of operation. The determining factor of whether the translation of link 394 initiates the ordinary multiplication or the auxiliary operation is dependent upon whether the conventional multiplier storage register has been shifted out of its home, or inoperative, position by the insertion of values thereinto through the multiplier value key 63.

*(1) Interlock between normal and auxiliary multiplication (FIG. 16)*

In the present invention, the rear end of the link 394 is supported by, and has a lost motion connection with, a normal multiplier clutch control arm 364, as is best shown in FIG. 17. This connection may comprise a slot 365 formed in the rear end of the link 394, which slot embraces a pin 366 mounted on the normal multiplication clutch control arm 364 (corresponding to clutch arm 525 of Malavazos Patent No. 3,090,554). The clutch control lever 364 is pivoted on the frame plate by any suitable means, such as pivot pin 368. A weak tension spring 367 tensioned between the pin 366 and a stud on the rear end of the link normally biases the link forwardly to an inoperative position. This spring is not strong enough to itself operate the clutch arm 364 against the friction which holds it in engagement with the normal multiplication control clutch 363.

In the present invention, the link 394 carries a live interponent 500 which is pivotally mounted on the link by any suitable means, such as pin 501. The interponent is resiliently biased to a lower position (shown in FIG. 17) by a spring 502 tensioned between a pin 503 carried by the interponent and a stop pin 504 secured to link 394. The rear end of the interponent 500 is formed as a concave shoulder 505 which (when the interponent is in the lower position shown in FIG. 17 in which its lowered edge engages stop pin 504) is adapted to engage the pin 366 upon translation of the link 394 rearwardly. The forward end of the interponent 500 carries a pin 506 which is adapted to be engaged by a rearwardly extending arm 507 carried by the spoke of the gear sector 362 of the automatic decimal mechanism shown in Malavazos Patent No. 3,066,864. It will be recalled that this sector, in the home position of the multiplier storage register, occupies a counter-clockwise position shown in FIG. 16. In this situation, the arm 507 engages the pin 506 to rock the interponent 500 upwardly, as shown in that figure. However, when the multiplier storage register is shifted a single order to the left by the insertion of a single multiplier value, the sector 362 rocks one increment clockwise. Thereupon the arm 507 releases pin 506 to permit the interponent 500 to rock to the lower position shown in FIG. 17, from the force of spring 502.

In the present invention, the normal multiplier clutch control lever 364 is provided with a downwardly extending tail which terminates in an ear 508 which is adapted to be engaged by a corresponding ear 621 mounted on a link 594 (see FIG. 19) when the auxiliary clutch, to be described in the next section, is operated to initiate a multiplication operation, as will be described in Section 3 below.

A second clutch control arm 515 (FIGS. 16 and 21) is pivotally mounted on pivot stud 368 immediately to the left, or outside, of the clutch control lever 364. This auxiliary clutch control lever 515 carries a pin 516 which, in the normal position of the two clutch control arms, lies slightly above pin 366 on arm 364. When the interponent 500 is in the raised position shown in FIG. 16, its shoulder 505 lies opposite pin 516. Then, if the link 394 is moved rearwardly, the interponent will engage pin 516 instead of pin 366, and thus operates arm 515 instead of clutch control lever 364. It is thus obvious that the operation of the override mechanism and the rearward translation of link 394 will operate the regular multiplier control cluster 363 by rocking arm 364, or alternatively rock auxiliary clutch control arm 515 to cause operation of the auxiliary, or squaring, clutch and cam 530 to be described in the next section.

For the moment, it should further be noted the upper end of clutch control arm 515 is formed as a shoulder 517 adapted to engage ears of the clutch mechanism of the squaring cam cluster. It should also be noted that the clutch control arm 515 is held resiliently in either its engaging or its disengaging position by means of a toggle spring 518, one end of which is seated on a pin 519 on the clutch control arm 515 and the other end of which is seated on a pin 844 of a cam follower lever 841, the operation of which is described in the next section.

*(2) Auxiliary clutch and cam (FIGS. 16 and 19 to 27)*

The rocking of the clutch pawl 515 controls what can be loosely called a "quarter-cycle clutch" and cam assembly 530 shown in considerable detail in FIGS. 21 and 22. This "clutch," as it may be loosely called, rotates approximately 90° at each operation (which occurs, roughly, in the fourth quarter of a machine cycle). In these four operations the clutch controls the following:

(a) In the first cycle it sets the clutch that controls the setting of the keyboard value into the squaring storage register;

(b) In the immediately succeeding cycle, after the value has been set into the storage register in the first three-quarters of a machine cycle, releases this setting clutch and simultaneously releases the multiplier control clutch assembly 363, and is latched in this position;

(c) Then when the "0" sensing mechanism sense the fact that all of the storage gears stand at "0," this clutch is released from its 180° position to rotate another 90° to set the machine for a restore cycle in which all the mechanisms are restored; and (d) Finally, in the succeeding cycle, it rotates from the 270° position back to its home, or inoperative, position and the machine is restored and ready for another operation.

The clutch 530 is driven (as is the clutch 363) from the main drive shaft 162. A gear 531 (FIG. 16) is rigidly mounted on this drive shaft 162 immediately to the left of the left-hand control plate 94. This gear is constantly in mesh with, and therefore constantly drives, a compound gear assembly, the driven gear of which lies behind gear 532 (FIG. 19). This compound gear assembly can be formed as a spool, or other integral construction, but it is simpler to mount the three sections thereof rigidly on a shaft 533 which is journalled in the left-hand control plate 94 and a bearing bracket 534 that is mounted on the left side frame plate. In the preferred construction, the gear 532 is also rigidly secured to the shaft 533, which gear 532 lies in the plane of clutch member 541 (FIG. 22). It is desirable to mount the gear 531 immediately adjacent the control plate 94, as other operating members must be placed to the left thereof, and it is necessary to space the cam driven by clutch 530 slightly away from the frame plate. It is desirable to have two gears corresponding to gear 532 (FIGS. 16 and 19) mounted on the same shaft in the same relative angular position, the one meshing with gear 531 and the other utilized to drive the second portion of the clutch, as will be described in the next paragraph. Associated with the outer gear 532 is a single tooth gear 535, likewise rigidly mounted on the shaft 533. This single tooth gear lies in the plane of the four tooth clutch member 540 (FIGS. 21 and 22). It will be understood that the compound gear assembly, including the two full gears 532, the single tooth gear 535, and shaft 533, rotates constantly while the main drive shaft 162 is in operation. Incidentally, it can be noted that this compound gear assembly is that shown in Malavazos Patent No. 3,090,554 (see FIG. 20 of that patent), and also drives the normal multiplication mechanism as there described.

The driven portion of the clutch 530 is best shown in FIG. 21 and comprises two gear sectors 540 and 541. The first gear sector 540 of the clutch is rotatably mounted on a shaft 542, also journalled in left side control plate 94 and the bearing bracket 534. This sector is formed with four isolated teeth 543, equiangularly spaced around the periphery of the sector. About halfway between two of the teeth is a laterally extending ear 544 lying in a plane adapted to engage the upper end 517 of the clutch control pawl 515. Diametrically opposed to the ear 544 is a second ear 545 extending laterally from the sector a greater distance than the ear 544, so that it is adapted to engage a shoulder 843 on a restore cam follower 841. The second section 541 of the clutch assembly comprises a multilated gear (which, if perfect, would have twenty-four teeth, the same number of teeth as on gear 532). The teeth of this mutilated gear 541 are arranged in four groups of four teeth 546 each, each group being separated from the others by the space 547 equivalent to two gear teeth. A spring 548 is tensioned between the ear 545 on sector 540 and an ear 549 which is riveted to, or otherwise rigidly secured on, the gear 541. The first sector is formed with a shoulder 550 adapted to engage ear 549 when the spring is contracted.

The second gear segment 541 lies in the plane of the outer full gear 532, and the first gear segment 540 and the single tooth drive gear 535 lie in the same plane to the left thereof. When the gear segments 540 and 541 occupy their normal, inactive position, the isolated teeth 543 on segment 540 lie in the same angular position as the second tooth of each group of teeth on sector 541. In this event the ear 544 on segment 540 is held by the shoulder 517 on the end of clutch pawl 515. However, when the pawl 515 is rocked (counter-clockwise in FIG. 21), away from ear 544, the spring 548 snaps the outer sector 540 forwardly (counter-clockwise in this figure) until the shoulder 550 on the outer sector engages the ear 549. In this position of the two gear sectors, the single teeth 543 lie one tooth space in advance of the respective group of four teeth 546 on sector 541 (as shown in FIG. 21).

Normally, the second gear sector 541 lies in such an angular position that the blank, or untoothed, section 547 lies opposite the gear 532. In this position of the parts, the gear 532 (which rotates constantly when the machine is in operation) has no affect on the clutch 540, 541, as the teeth of the sector 541 are not engaged by the teeth of gear 532. Likewise, in the usual position of the clutch sectors 540, 541, the single tooth 543 on the sector 540 is so angularly displaced from the rotating single tooth gear 535 that the first sector is never engaged by the tooth of the single toothed gear 535.

When the outer sector 541 is released by control lever 515, it (the sector) is snapped forwardly by its spring 548 to the counter-clockwise position shown in FIG. 21 from the normal position shown in FIGS. 16 and 19. Thereupon the single tooth 543 will lie one tooth space in advance of the group of four teeth 546 on sector 541. In this situation, the single tooth gear 535 (at approximately the start of the fourth quarter of a cycle of operation) will engage the tooth 543 and thus drive the clutch assembly 530 forwardly (counter-clockwise in FIGS. 16, 19 and 21). This causes the teeth 546 to be rotated rotated into the path of the teeth on gear 532, so that the clutch 530 will rotate 90° and stop when the succeeding blank, or untoothed portion, 547 lies opposite the gear 532. It can be noted here that the clutch assembly 530 will thus be rotated one-fourth of a cycle in the fourth quarter, or quadrant, of a machine cycle, and then comes to rest.

A second incremental rotation will follow in the fourth quadrant of the next cycle as the first sector 540 still lies in the advanced position. Thus, the clutch 530 will rotate from the 90° to the 180° position automatically at the end of the second machine cycle after clutch pawl 515 has been operated. Toward the end of this cycle the long ear 545 will engage a shoulder 843 formed on the cam follower arm 841. At this time, the third tooth 543 on the sector 540 will have been rotated beyond engagement with the single tooth gear 535, so that the sector 540 can stop. However, the set of four teeth 546 on sector 541 are still enmeshed with gear 532, so that this second sector will continue to be driven forwardly until the third blank space 547 registers with gear 532 and the sectors are in the relative position shown in FIGS. 16 and 19 and the clutch is again disengaged.

It will also be noted here that after the "0" sensing mechanism senses a condition of all zeros in the squaring register, the cam follower 841 will be rocked so that its shoulder 843 will disengage ear 545 and the clutch 530 is again operative to rotate (counter-clockwise in FIGS. 16, 19 and 21) through two increments of 90° each in the two succeeding cycles of operation. In the first of these two final cycles, the clutch assembly rotates to the 270° position and this rotation will condition the machine for a "restore" cycle; and in the second of these final cycles, after the machine has been reset in its normal condition, the clutch assembly returns to its "0," or inoperative, position.

A detent plate 555 is pivotally mounted on shaft 542, preferably immediately adjacent the gear sector 541. In our preferred construction, as is best shown in FIG. 22, this plate is formed as one flange of a spool 556 which is rigidly mounted on the shaft 542. The flange 555 is formed with four equally spaced detent notches 557. A roller 558 carried by a detent arm 559 engages the periphery of the plate 557. A relatively strong spring 560 (FIG. 19) is tensioned between a seat in the rearward end of arm 559 and a pivot stud 561 and strongly biases the arm and roller into engagement with the periphery of the plate 555. When the roller 558 is seated in one of the notches 557, the assembly is held rather strongly in the detented position. The assembly can be rotated only by the direct drive from the compound gear 535, 532. The notch and roller also provide that the assembly will be stopped in an inoperative position as the force of the spring 560 is such that it not only will prevent overthrow of the detent plate 555, but in the event of underthrow, is strong enough to move the assembly a few degrees into a truly centralized position.

The other flange of the spool 556 is formed as a single lobed cam 565 (FIGS. 23 to 26). The single lobe 566 is relatively short and is placed 180° from the home position of the cam (FIGS. 23 and 24 show the cam and detent assembly in their "0" or home position in which the squaring program mechanism is inoperative). This lobe 566 has a rather sharp rise, so that its cam follower rides upon the section of uniform radius throughout the first and fourth rotational increments of the cluster (in the first and fourth cycles of the program); rides up on the lobe in the second cycle, where it is held at the extreme position by the latching of the clutch 530 at its 180° position; and rides down from the lobe in the third cycle. The cam 565 also carries a pair of rollers 567 and 568, the first lying on the left face of the cam, in the space between the cam and the detent, and the second on the opposite face of the cam, between the cam and the frame plate 94 (as shown in FIG. 22). There are thus three followers to this cam 565: arm 590 (FIGS. 24 and 26), the roller 591 of which rides upon the periphery of the cam, the arm being rocked to its operative position in the second machine cycle; the arm 841 (FIGS. 19, 21 and 26), which is rocked by roller 567 as the cam passes from its 180° to its 270° position; and an arm 575 (FIGS. 19, and 23 to 25), which is rocked by roller 568 in the first 90° increment of the clutch 530 and cam 565 (in the first cycle following the operation of clutch pawl 515).

*(3) Setting of keyboard value into auxiliary register (FIGS. 2, 9, 19 and 23 to 27)*

The first major program controlled by the auxiliary clutch 530 is the setting of the keyboard value into an auxiliary register, after which it will be used to control the multiplication operation. This program takes two machine cycles (the first two 90° increments of clutch 530) in the first of which the machine is set for the interregister transfer operation, and in the second of which (prior to the second incremental rotation of clutch 530) the keyboard value is actually set into the auxiliary register.

The first 90° of rotation of the clutch 530 and cam 565 is effective to condition a mechanism for the setting of the keyboard value into the squaring storage, or auxiliary multiplication, register. This is accomplished by means of the operation of the cam follower 575 (FIGS. 19, 24 and 25), the upper edge of which engages the cam roller 568. This rocking of the cam follower 575 takes place in the last quarter of the cycle in which the override mechanism is operated. The override mechanism is operated in the first half of a cycle and has, therefore, operated pawl 515 to release the ear 544 and thus set the clutch 540, 541 for operation. The clutch becomes effective in the fourth quarter of that machine cycle and consequently rocks the cam 565 through an angle of 90° (clockwise in FIG. 23 or counter-clockwise in FIGS. 24 and 25). This rotation of the cam 565 obviously rocks the arm 575 from the position shown in FIG. 24 to that shown in FIG. 25.

The cam follower arm 575 is rigidly mounted on a transverse shaft 576 (FIG. 19). The strong spring 577 tensioned between a seat on a projection of the follower arm 575 and the second follower arm 590 strongly biases the assembly, including the follower 575 and shaft 576, to the home position shown in FIG. 24.

At the right side of the machine, the shaft 576 carries an arm 578 (FIG. 27) which is rigidly mounted on the shaft. A link 579 connects the arm 578 with a back-transfer clutch control lever 580, which corresponds to the lever 1074 of Malavazos Patent No. 3,045,907, issued July 24, 1962, as shown in FIGS. 2 and 20 of that patent. Since this clutch member and the members controlled thereby are fully described in that patent, the parts will only be briefly mentioned here. It should suffice to point out that this clutch control lever 580 is pivoted on shaft 581 and is biased to an inoperative position by spring 582. At its upper end, the lever supports one end of a bail 583 which is formed as a comb to embrace annular notches formed in the hub of a series of clutch drivers 584 (FIG. 2). These clutch members 584 are slidably but nonrotatably mounted on the square, or selection gear, shafts 156. Associated with each driving member 584 is a driven member 585 which is pinned to, or otherwise rigidly mounted, on a respective shaft 586. Each shaft 586 extends longitudinally in the machine, the front ends being journalled in the front cross plate 93 and in an auxiliary bearing bracket 97 shown in FIG. 9. These shafts carry their respective orders of the storage register which will be described in the following section entitled "Storage Register."

It is obvious that the rocking of shaft 576 (clockwise in FIGS. 24 and 27) rocks the clutch control lever 580 (clockwise in FIG. 27 and counter-clockwise in FIG. 2) to cause the driving members 584 to engage the driven members 585. This takes place in the first increment of rotation of clutch 530 and cam 565, i.e., in the fourth quarter of the machine cycle in which the override mechanism is operated, after the digitation phase of that cycle has been completed. It will be understood that as the selection gears 154 and 155 are locked in their value positions by the latching of the keys 51, the actuators 160 will cause them to rotate the proper angular increments in every cycle of operation. However, throughout the programming of clearing, the register and shifting the carriage to the extreme left-hand position, such cyclic rotation of the selection gears 154 and 155, and the square or selection shaft on which they are mounted, has no effect as the digitation control gate 167 is in the neutral position shown in FIG. 2. Then, in the cycle in which the override mechanism is operated and clutch 530 and cam 565 are rotated to the 90° position, clutch 584, 585 is engaged. This engagement occurs after the digitation phase of that cycle has been completed, so that the square shafts 156 are at rest. The arm 575 is held in its rocked position (shown in FIG. 25) through approximately the first three-fourths of the succeeding cycle of operation, which is more than enough for digitation, or the entry of the keyboard value into the storage registers to take place as the clutch 584, 585 is engaged throughout this portion of the second machine cycle. It is obvious that shafts 586 annd those parts which are nonrotatably mounted thereon, will be rotated through increments corresponding to the value standing in the respective orders of the keyboard 51.

After the digitation phase of this second machine cycle in which the value is transferred from the keyboard into the storage register, at approximately the 270° position of the main drive shaft, the single tooth gear 535 and full gear 532 again rotate the clutch 530 through another angle of 90°, moving the cam 565 from the position shown in FIG. 25 to that shown in FIG. 26. In this position of the cam, the follower arm 575 is returned to its normal position shown in FIGS. 24 and 26 and the transfer clutch 584, 585 is again disengaged.

At the end of this cycle, the clutch 530 and cam 565 are latched in their 180° position shown in FIG. 26 by the engagement of ear 545 on shoulder 843 of follower 841 as heretofore explained.

*(4) Storage register (FIGS. 5, 6, 9, 30 and 31)*

The auxiliary multiplying, or "squaring," storage register comprises a series of ordinally arranged storage members 700, which are slidably but nonrotatably mounted on the respective shafts 586 in front of the front crossbar 93. These members are formed as a spool 701 with a flange at each end, the rear flange being formed as a ratchet wheel 702 (FIG. 31), and the front flange as a disk 703 (FIG. 6) with a single notch 704. This notch registers with a "0" sensing arm 850, to be described shortly, when the storage member 700 registers a "0." It will be recalled that when the carriage B is returned to the extreme left-hand, or home, position, the override mechanism is effective to release the auxiliary clutch 530 to cause the operation of the clutch 584, 585 (FIGS. 2 and 27), whereupon, in the digitation phase of the next cycle, the value standing in the keyboard is run into the shaft 586 and hence into the storage members 700.

It has been mentioned that the storage members 700 are slidably but nonrotatably mounted on the shaft 586. Any suitable key arrangement is satisfactory, but we prefer to shape the shaft 586 as a square shaft where it registers with the storage members 700, as is best shown in FIGS. 30 and 31. The storage members 700 are dented in their respective position by any suitable means, such as star wheel 705 on the shaft 586 which is engaged by the nose of a detent pawl 706. The detent pawl 706 is suitably mounted on the front frame plate 93 by any suitable means, such as pivot stud 707, and each is biased into engagement with its respective star wheel 705 by any suitable spring 708. Normally, the storage member 700 lies forwardly of, and out of meshing engagement with, the feed pawls to be described in the next paragraph as illustrated in FIGS. 5, 9 and 30. They are separately moved into operative position by the operation of a series of coordinal control cams 645 (FIG. 30). These cams are helically mounted on a common drive shaft 635, which is operated as described in Section 5 (c) entitled "Enable Operation of the Cam Shaft 635." These cams 645 are so arranged that one, and only one, of the cams 645 will be operative in any of the incremental positions of the shaft (except in the home, or "0°" position). A single nose 646 on each cam is adapted to engage a roller 715 which is mounted on the lower end of a respective rocker 716, pivotally mounted at its elbow on a common shaft 625. The upper arm of each rocker 716 lies between the two flanges 702 and 703 of the storage member 700, as is best shown in FIGS. 5, 9 and 30. Each rocker is biased to its forward, or inoperative, position shown in these figures by a suitable spring 717 (FIG. 30) tensioned between a seat on the rocker and a crossbar bearing plate 718 mounted on the front of the base plate 85. Thus, the force of each spring 717 individually biases its coordinal rocker 716 to the inoperative position shown in FIG. 30. The operation of the cam tooth 646 as the cam shaft 635 is rocked to an operative position for each order, rocks the rocker 716 to an operative position (clockwise in FIG. 30 from the solid line position to the phantom line position shown). In that event, the ratchet wheel 702 lies immediately adjacent the front crossbar 93 and is in the position to be operated by the feed mechanism which will be described in the next paragraph. It is believed obvious that one, and only one, of the storage members 700 can be in operative position at any one time, so that one, and only one, order of the value in the storage member 700 will be effective to control a multiplication operation.

The feed member comprises a bar 725 (see also FIG. 4) which is slidably mounted on the front crossbar 93 (FIGS. 30 and 31). In each order this bar carries a bellcrank feed member 726 which is pivotally mounted thereon by any suitable means, such as pivot stud 727. Each feed member 726 is provided with an ear 728 at its upper end, which ear is adapted to engage the teeth of the coordinal ratchet wheel 702. Each feed bellcrank 726 is biased to an upper and operative position by a suitable spring 729 tensioned between a seat on the lower end of the bellcrank 726 and the teeth 730 of a comb 731 affixed to the feed bar 725. It is believed obvious that as a storage member 700 is moved to its operative position (shown in phantom lines in FIG. 30) the ratchet wheel 702 thereof will be engaged by its coordinal bellcrank 726. It should be noted that all of these bellcranks are operative with the operation of the feed bar 725, and each reciprocates with the bar 725. Thus, the reciprocation of the bar 725, once in each machine cycle, is effective to feed the operative storage member 700 one increment. The feed bar 725 is reciprocated by means of the mechanism shown in FIGS. 11 and 12 and described in Section 5 (d) entitled "Enable Operation of the Feed Bar."

*(5) Condition machine for control by auxiliary register (FIGS. 24, 25 and 26)*

The second increment of rotation of the cam 565 (from the position shown in FIG. 25 to the position shown in FIG. 26) rocks the second follower arm 590 (which arm can be called a "conditioning" or "setting" arm) from the position shown in FIG. 24 to that shown in FIG. 26. A roller 591 on the outer end of the setting arm 590 engages the periphery of the cam 565, the arm and roller being strongly biased into engagement with the cam through the spring 577 which, as already mentioned, is tensioned between the seats on the arm 590 and the follower arm 575. The setting arm 590 is rigidly mounted on a shaft 592 that extends between, and is journalled in, the left side frame 88 and the left side control plate 94. The rocking of the conditioning arm 590, and the consequent rocking of shaft 592 (counter-clockwise from the position shown in FIG. 24 to that shown in FIG. 26) is effective to set the machine for a multiplying operation under the control of the auxiliary register. This operation of the follower arm is effective to: (a) block operation of the normal multiplication control mechanisms by blocking operation of the feed pawl which returns the multiplier segments to a "0" position, and disabling operation of the multiplier register shift mechanism—while permitting operation of the shift of the carriage B at the end of each ordinal series of operations; (b) release the multiplier control clutch and cam cluster 363 to initiate a multiplication operation; (c) enable operation of the cam shaft 635 which controls the order in which the squaring mechanism is operative; (d) enable operation of the feed bar 725 to return the storage members 700 to a "0" position, order-by-order; (e) conditions a "0" sensing mechanism for operation, so that the squaring operation will be terminated as soon as all of the squaring register wheels have been returned to their "0" position. These will now be described in sequence.

(a) BLOCK OPERATION OF NORMAL MULTIPLYING MECHANISM (FIGS. 10, 11, 19, 20, 28 AND 29)

The shaft 592, which is rocked (counter-clockwise in FIG. 24) by the cam 565 rotating to the second position shown in FIG. 26, at its outer or left-hand end, carries an arm 593 (FIGS. 19 and 20) rigidly mounted thereon. The lower end of the arm 593 supports a forwardly extending link 594 to which it is pivotally connected by an suitable means, such as pin 595. Adjacent its forward end, link 594 is supported on a stud 596 by a pin-and-slot connection, not shown, the stud being riveted to, or otherwise rigidly secured on, the left-hand control plate 94. The link 594, is, therefore, translated forwardly (to the right in FIGS. 19 and 20) from the rocking of the cam follower arm 590 in the last portion of the second incremental rotation of the clutch and cam assembly 530.

The forward translation of the link 594, among other things, is effective to disable the multiplier register carriage shift that normally occurs in a multiplication operation. This is readily effected by means of a pin 601 (see especially FIGS. 28 and 29) which is secured to an upwardly extending projection 602 of the link 594. The pin 601 abuts the rear edge of a short arm 603, as shown in both figures—FIG. 28 showing the home position of link 594 and arm 603 and FIG. 29 showing these parts in the adjusted position. The arm 603 is mounted on a short transverse shaft 604 which extends from the left side control plate 94 to the left side frame 88. The forward translation of link 594 rocks the arm 603 and its shaft 604 (clockwise from the position shown in FIG. 28 to that shown in FIG. 29). This arm 603 is connected to an arm 605. This arm 605 corresponds to the arm 787 shown in FIG. 20 of the Malavatos automatic decimal patent, No. 3,066,864.

At an intermediate point, the shaft 604 carries an arm 606 (FIG. 10). The rocking of the shaft 604 (counter-clockwise in this figure) causes the free end of arm 606 to lie immediately adjacent a pin 607 on an interponent arm 608. Thus, the normal rocking of shaft 609, which is caused by the multiplier control mechanism when a sector has been returned to "0," or in the instant case, when one of the storage gears has been returned to "0," to cause a shift of the multiplier register carriage (not shown), is blocked. This is permitted by the resilient connection shown in FIG. 10 and is fully shown and described in the Malavazos patent, No. 3,066,864, just mentioned. By this means it is obvious that the normal shift of the multiplier carriage caused by rocking of shaft 609 is prevented.

The rocking of the arm 603 is also effective to block operation of the usual shift control lever which is operated by return of a multiplier sector to its home position. Preferably, for this purpose we use the mechanism shown in the Malavazos patent, No. 3,066,864 just mentioned, with particular reference to FIG. 20 of that patent. The arm 605 is rigidly mounted on the outer, or left, end of a spool (not shown) which is rotatably mounted on a shaft 610 (FIG. 29). A short arm 611 is carried by the right end of this spool, this arm lying close to the left side control plate. When the levers 605 and 611, which, in effect, form an offset bellcrank, are rocked counter-clockwise to the position shown in FIG. 29, the upper end of arm 611 underlies an ear 612 formed in the forward end of an arm 613 which is mounted on short shaft 614. The shift control arm 356 (FIG. 11) is also rigidly secured to this shaft 614, so that the moving of the arm 611 into its blocking position shown in FIG. 29 automatically and completely blocks any operation of the shift control arm 356, or the mechanism controlled thereby.

The rocking of the cam follower arm 590 (FIG. 24) and shaft 592 is also effective to disable the conventional multiplier feed pawl 355 (FIG. 11). As shown in this figure, the shaft 592 mounts a depending arm 803 which is rigidly secured thereto, the arm rocking clockwise in this figure. The blocking of operation of the feed pawl is readily secured by means of a link 810 (FIG. 11), the rear end of which is pivotally mounted on the upper portion of the arm 803 by any suitable means, such as pivot pin 811. The forward end of the link 810 is slotted, as at 812, to embrace a pin 744 on the lower leg of the bellcrank holding pawl 742. Thus, the rocking of the arm 803 (clockwise in FIG. 11) rocks the disabling pawl 742 to its disabling position, and, therefore, holds the feed pawl 355 in an inoperative position.

(b) INITIATE OPERATION OF MULTIPLIER CONTROL CLUTCH (FIGS. 16, 19, 20, 28 AND 29)

It was previously mentioned that the clutch jawl 364 (FIG. 16), which controls operation of the clutch and cam cluster 363 that programs a multiplication operation, is provided with a tail terminating in an ear 508. The link 594, as shown in FIGS. 19, 20, 28 and 29, is formed with a depending projection 620 which terminates in an ear 621. This ear 621 lies a short distance behind the ear 508 on clutch control pawl 364 (see FIG. 16) when the machine is at rest. The forward translation of link 594, after some lost motion, and actually at almost the end of the stroke of the link, is effective to engage ear 508 and rock clutch pawl 364 to its disengaged position, and thereupon enable engagement of clutch 363 and the initiation of a multiplication operation. It will be recalled that at this point in the program of clutch and cam cluster 530 the first sector 540 of auxiliary clutch 530 has been rocked against operation by the engagement of its ear 545 with the shoulder 843 of cam follower arm 841. Thus the squaring program is locked in its half-cycle, or 180°, position and operation is released to the multiplier mechanism described in the Malavazos patent, No. 3,090,554. In view of the fact that this program mechanism is rather complex, and requires a rather lengthy description for a complete disclosure, reference will be made to that patent where this mechanism is described beginning in Column 25 and ending in Column 38. It should perhaps be mentioned that the clutch 363 rotates to approximately its 180° position to initiate the multiplication program; and is then latched in that position until the multiplication operation is completed. At the completion of the multiplication operation, the clutch control pawl 364 is again operated to release the clutch, and the multiplier mechanism is restored to its normal position—at which time the clutch is released from its half-cycle position and allowed to return to the full-cycle position shown.

It is believed apparent that the forward translation of link 594, through the operation of its ear 621 on ear 508 of clutch pawl 364, is effective to initiate a multiplication operation. This operation begins at the start of the next machine cycle, the normal multiplication interlocks preventing any digitation prior to that time. It will be understood that, in this instance, the multiplication operation is controlled by the gears of the auxiliary storage mechanism of the present invention, which will be described below in subsections (c) and (d), and not by the usual multiplier segments. Specifically, this control is effected from shaft 625 (FIG. 30) which is operated by the operative one of an ordinally arranged series of "0" sensing arms upon the return of the operative storage member 700 to its "0" position. An arm 626 (FIG. 18) is rigidly mounted on the left end of the shaft 625. This arm supports the front end of a link 627, the rear end of which is connected to a bellcrank 628 mounted on shaft 609. The bellcrank 628 is adapted to engage a pin 630 on a tail 629 of the clutch pawl, which corresponds to clutch pawl 709 shown in FIG. 24 of the Malavazos patent, No. 3,090,554, and is identical to that pawl except for the addition of the tail 629 upon which the pin 630 is mounted. Thus, the rocking of shaft 625 is effective to cause operation of the clutch 631 which controls the ordinal steps of a multiplication operation.

(c) ENABLE OPERATION OF THE CAM SHAFT 635 (FIGS. 5, 9, 18 TO 20, AND 28 TO 30)

The order of the keyboard which is operative to control a multiplication operation is determined by the angular position of the cam shaft 635 (FIGS. 5, 9, 18 to 20, and 28 to 30). This shaft is journalled in a pair of bearing brackets 636 mounted on the base plate 85, the left end of the shaft being journalled in the bracket 636 shown in FIG. 18. On its right end, adjacent to the right control plate 86, it carries a star detent wheel 637 (FIGS. 5 and 6) rigidly mounted thereon. This detent wheel is engaged by a roller 638 which is carried by an arm 639. The arm 639 is biased, by means of a strong spring 640, into engagement with the star wheel and is thus effective to detent the cam shaft 635 in any adjusted operative position.

A plurality of ordinally arranged cams 645 are rigidly mounted on the cam shaft 635 (FIGS. 9 and 30). In a ten-order machine, such as that illustrated in FIG. 1, there are ten such cams 645 mounted on the cam shaft 635 and they are mounted in a helix around the shaft, each separated from those adjacent by an angle of 32° 43′ 38″ (one-eleventh of a full circle). While there are ten cams 645 on the shaft 635, there are eleven angular positions—one operative position for each cam and an eleventh position in which none of the cams are operative. This shaft 635 and the cams 645 mounted thereon rotate during the multiplication operation in a counterclockwise direction in both of these figures. It is apparent that in the normal position of the parts, none of the cams are effective, but thereafter each incremental rocking of the cam shaft 635 brings a succeeding ordinal cam 645 into operative position. As seen in these figures, each cam 645 comprises a single short rise tooth that becomes effective with each incremental step of rotation to render successive cams operative.

The feed mechanism for adjusting the cam shaft 635 progressively to cause operation of successive higher orders of the squaring mechanism and in a restore phase to return the shaft to its home, or inoperative, position is shown in FIGS. 19, 20, 28 and 29. This feed mechanism comprises a feed ratchet 650 and a restore ratchet 651. Preferably, these two ratchets are formed as a spool connected by a quill shaft, or spool section, 652. Both are rigidly secured to the shaft 635, so that their rotation is effective to control the angular position of the shaft 635 and cams mounted thereon. It should be noted that the teeth of the ratchets face in opposite directions, for the feed ratchet 650 is adapted to rotate the cam shaft 635 in one direction (clockwise in these figures) and the restore ratchet 651 is adapted to return the shaft in the opposite direction. It should further be noted that the feed ratchet 650 has a tooth 664 of approximately double the height of the others, which tooth is in the home, or first feed, position (shown in FIG. 29); and that restore ratchet 651 has a long blank 663 also in the home, or last restore feed, position (shown in FIG. 28).

An eccentric cam 653 is mounted on the left end of the main drive shaft 162 (FIGS. 19, 20, 28 and 29). This eccentric cam is embraced within a cam follower 654. Two feed links 656 and 657 are pivotally mounted on the tail 655 of the cam follower 654: (a) link 656 which is adapted, when operative, to engage the feed ratchet 650 and rotate the cam shaft in a direction to bring the adjacent higher order cam 645 into operative positive (clockwise in these figures); and (b) a restore link 657 adapted, when operative, to engage ratchet 651 and thereby rotate the cam shaft 635 in the opposite direction to return it to its home, or inoperative, position. It is apparent from these figures that just as the ratchet teeth of two cams face in opposite directions, so the feed links are effective, likewise in opposite directions, to operate them. It is also apparent from these figures that the feed link 656 is provided with a forwardly extending nose 661 adapted to push ratchet 650 (clockwise in these figures), and the restore link 657 is provided with a rearwardly facing nose 662 adapted to pull ratchet 651 (counterclockwise in these figures). It is, therefore, obvious that reciprocation of both links is operative upon their respective ratchet wheels 650 and 651, in opposite directions, and one or the other will be effective and the other disabled as is required for their respective phases of operation.

Normally, the feed link 656 is held disabled and the restore link 657 is held enabled by the mechanism shown in FIGS. 19, 20 and 28, and during the progress of a squaring operation, the restore link 657 is disabled and the feed link 656 is enabled (shown in FIG. 29). Both links 656 and 657 preferably are held in the proper plane to operate their respective ratchet wheels by means of slots 658 and 659, respectively, formed in a bracket 660, as shown in FIG. 20.

A pair of control bellcranks 670 (for the feed link 656) and 671 (for the restore link 657) are mounted on the stud 596 (see FIGS. 19, 20, 28 and 29). The parts are shown in a normal, or restore, position in FIGS. 19, 20 and 28 and in the feed position in FIG. 29. The restore bellcrank 671 is provided with an elongated slot 672 which embraces a pin 673 carried by a projection of restore link 657. This bellcrank is urged to an operative position (clockwise position shown in FIGS. 19, 20 and 28) by a spring 674 tensioned between a seat in the tail of the bellcrank and a stud 675 carried by a depending arm 676 of link 594. A stop pin 677, also on the arm 676, prevents overrocking of the control bellcrank 671, and also rocks the bellcrank 671 from the position shown in FIG. 28 to that shown in FIG. 29 upon forward translation of link 594. Such rocking of the bellcrank 671 from the position shown in FIG. 2 to that shown in FIG. 29, is obviously effective to lift the restore link 657 from the position shown in FIG. 28 to that shown in FIG. 29. Thus, the forward translation of link 594 (which is caused by the second step of clutch 530 to rock cam 565 from the position shown in FIG. 24 to that shown in FIG. 26) is effective to disable the restore link 657.

The feed control bellcrank 670 (FIGS. 28 and 29) is provided with a slot 680 in its forward arm 679. This slot embraces a pin 681 secured to the feed link 656. The bellcrank is biased (in a clockwise direction in these figures) by a light spring 682 tensioned between a seat in the upper arm 678 of this bellcrank and a stud on the frame of the machine. Normally, however, rocking of the bellcrank 670 is prevented by a stop pin 683 carried on an upwardly extending projection 684 of the link 594. Thus, the forward translation of link 594, by moving the pin 683 forwardly, or to the right in these figures, enables the control bellcrank 670 to rock in a clockwise direction. Such rocking of bellcrank 670 depresses the nose 661 of feed link 656 down to the position shown in FIG. 29, in which it can engage the teeth of ratchet wheel 650.

It should be noted that the restore ratchet 651 is provided with a long blank, or mutilated, tooth 663 adapted to register with the nose 662 of restore pawl 657 when the cam shaft 635 has been returned to its home position. In this position, the link 657 can reciprocate for an indefinite time without turning the shaft 635 and its cams 645 (FIG. 9) beyond the home position. Thus, regardless of the number of cycles of machine operation, the cam shaft 635 will be returned to its home position and there remain, as the restore link 657 is thereafter unable to rotate the ratchet 651 and shaft 635. In this position of ratchet 651 the pawl reciprocates idly.

Similarly, it can be noted that the feed ratchet 650 has an extra high tooth 664 in its home position, in order to provide for an initial feed of the ratchet 650, in the first cycle of squaring operation, in which event the feed link 656 is dropped to an intermediate position shown in FIG. 29. In the first cycle of a squaring operation, the feed control bellcrank 670 is enabled to rock only a portion of the distance between its two extremes, i.e., sufficient to engage the upper portion of tooth 664 but not the adjacent tooth. It is retained in this intermediate position, in which the nose 661 is effective to engage the high tooth 664 but not the other teeth of the ratchet wheel. In this position, the feed link 656 is effective to rock the ratchet wheel, and hence the cam shaft 635, one increment and then remains inoperative, even though the feed link 656 remains in the same intermediate position. Incidentally, the pin 683 has moved forwardly a distance sufficient to permit bellcrank 670 to rock to the extreme position. This control bellcrank is retained in the intermediate position just mentioned, by means of a pin 685 that engages an arm 686, carried by the shift control shaft 609. At the termination of an ordinal series of operation, which termination is effected when the registering member 700 in the operative ordinal position returns to "0," the mechanism heretofore mentioned is effective to rock the shaft 609 and hence arm 686 (in a counter-clockwise direction in these figures). Such rocking of the arm 686 permits the control bellcrank 670 to rock the additional distance required to enable the nose 661 of the feed link 656 to engage one of the teeth of the ratchet 650 and hence rock the cam shaft 635 an additional increment.

It can be noted that at the end of a squaring operation, the cam shaft 635 will be in an adjusted position and will remain in that position due to the detenting effect of the star wheel detent 637 shown in FIG. 5. The cam shaft will not be restored to its home position until the succeeding operation. Regardless of what kind of operation follows, the restore pawl is effective to engage ratchet 651 if it is out of its home position. In any operation except squaring, the link 594 is in its rearward position (to the left as shown in FIGS. 19, 20 and 28), and the restore link 657 will be in its operative position with respect to its ratchet 651. Thus, regardless of the type of operation which follows a squaring operation, the restore link 657 will be effective to rock the ratchet 651 (counter-clockwise in these figures) until the cam shaft 635 is in its home position. If it should happen that the next operation is another squaring, the cam shaft will be restored to its home position prior to the time that the squaring operation itself will be initiated, as first the carriage must be shifted to the extreme home position—and that means that it will be shifted to the right as many increments as it was shifted to the left in the preceding squaring operation.

(d) ENABLE OPERATION OF THE FEED BAR
(FIGS. 4, 11, 12 AND 13)

The feed bar 725 which incrementally returns the operative one of the ratchet gears 702 toward its "0" position is reciprocated by means of the mechanism shown in FIGS. 11 and 12. The main drive shaft 162 carries another eccentric 735 which is embraced within a complementary cam follower 736. A link 737 connects the tail 738 of the cam follower 736 to a rocker 739 which is pivoted on the adjacent auxiliary frame plate 95 by any suitable means, such as pivot stud 740. Incidentally, it can be noted that a second arm 741 attached to the tail 738 operates the regular feed pawl 355 of the usual multiplier mechanism. This eccentric, the link 741 and feed pawl 355, and also link 737 and lever 739, are rocked with each cycle of machine operation. It can further be noted here that the feed pawl 355 is held in an inoperative position in all squaring operations, and in all operations except the digitation cycles in multiplication by a holding pawl 742, the operation of which has been fully described in Patents Nos. 2,371,752 and 2,399,917.

The lever 739 (FIG. 11) is provided with an ear 743 adapted to engage a shoulder 750 formed in the rear end of an interponent link 751. The forward end of the link 751 (to the left in FIG. 11) is pivotally mounted on one arm of a bellcrank 752 which, as shown in FIG. 12, is pivotally mounted on the base plate by any suitable means, such as pivot stud 753 (see also FIGS. 4 and 9). The forwardly extending arm of the bellcrank 752 carries a pin 754 which is embraced within a notch 755 formed in a bracket 756 formed on the left end of feed bar 725. The interponent 751 is resiliently biased into its upper, or operative, position by a suitable spring 757 (FIG. 11) but normally is held in a depressed, or disabled, position by means of a pin 764 carried by a control bellcrank 765. However, when the control bellcrank 765 is rocked (clockwise in FIG. 11 and counter-clockwise in FIG. 13), the interponent 751 is enabled to rise so that its shoulder 750 engages the ear 743. In that event, the rocking of the lever 739 (clockwise in FIG. 11) pushes the interponent forwardly, and hence rocks the bellcrank 752 against the force of its return spring 758 (FIG. 12). When the lever 739 returns to its other extreme position, the spring 758 pulls the bellcrank 752 rearwardly (clockwise in FIGS. 4 and 12) and hence pulls the feed bar 725 to its retracted position (left in FIG. 4). The feed of the operative register member 700 takes place on the power-driven forward stroke, so that spring 758 only has to return the linkage to its normal position.

The feed bar 725 is slidably mounted on the front crossbar 93 by a suitable pin-and-slot connection comprising pins 732 (FIGS. 4 and 30) which are embraced within slots 733 formed in the feed bar 725. This bar is normally in its leftward position due to the force of spring 758 (FIG. 12) on the bellcrank 752, and is shifted to the right by the rocking of the bellcrank.

The bellcrank 765 (FIGS. 11, 12 and 13) is a control member pivotally mounted on the left side auxiliary plate 95 by any suitable means, such as stud 768; and is held in its disabling position shown in these figures by three separate controls: the multiplier shift control mechanism; the sign character setting mechanism; and a squaring control bar 801.

The third mentioned control of the blocking bellcrank 765 is effected by a control bar 801 (FIGS. 11, 12 and 13) which is pivoted to the lower end of arm 803 (FIG. 11) by any suitable means, such as pin 804. The control bar 801 carries an upstanding ear 802 which lies in front of, and immediately adjacent, another pin 767 riveted to, or otherwise rigidly secured on, the lower leg of the bellcrank 765. When the control slide or link 801 is in the rearward position shown in these figures, the ear 802 engages pin 767 and holds the bellcrank 765 in the disabling position shown in FIGS. 11 and 13. However, when the link 801 is pushed forwardly, the ear 802 releases pin 767 and the bellcrank 765 is free to rise if the other controls permit. It will be recalled that lever 803 is rigidly mounted on shaft 592 and that this shaft is rocked as the auxiliary clutch 530 goes to its half-cycle, or 180°, position shown in FIG. 26, thereby rocking arm 590 on shaft 592 (counter-clockwise in FIGS. 24 and 26 and clockwise in FIG. 11). When so rocked, the lever 803 pushes the control link 801 forwardly and, among other things, releases the bellcrank 765 as heretofore explained. When held in the depressed position shown by any one of these three mechanisms, the bellcrank 765 is rocked to the position shown, whereupon the pin 764 depresses the interponent 751 so that its shoulder 750 is no longer engageable by ear 743.

By the three means here described, the control bellcrank is held in its inoperative position shown in FIGS. 11 and 13 by any one of the three controls mentioned, namely: the control link 801 when it is in its normal position; the shaft 790 (FIG. 13) and lever 789 when that shaft is in its normal inoperative position; and the shift control cam follower 778 and shift control shaft 609, when they are in the nonshift, or digitation, position shown. It is apparent that to release bellcrank 765, the machine must be operating in multiplication (effected by the counterclockwise rocking of shaft 790); the multiplication program mechanism must be in a digitation phase (for the counter-clockwise rocking of the follower arm 778 and shaft 609 during a shifting cycle disables the interponent bellcrank 765); and the squaring control link 801 must be in the forward position.

It was mentioned in Section I, Subsection II, "Multiplying Mechanism," that the interordinal shifting operation is under the control of the shift cam 775 (FIG. 13) which is driven by the half-cycle clutch 631. When the clutch and cam are in the half-cycle position opposite that shown, the lobe 777 holds follower arm 778 in the clockwise position shown. When the multiplying operation calls for an ordinal shift, the clutch is released to return to its full-cycle position, and arm 778 rides off lobe 777, and the multiplying mechanism is enabled (counter-clockwise from that shown). In the present invention, the follower 778 is formed with a rearwardly extending leg 780 which overlies pin 766 on interponent 765. Thus, when the arm 778, and consequently shaft 609, is rocked to the shift position (counter-clockwise from the position shown in FIG. 13), the leg 780 engages pin 766 to rock the bellcrank interponent 765 (clockwise in this figure) to cause disablement of the interponent link 751. On the other hand, when the arm 778 is held in the clockwise position shown in this figure by the lobe 777, and the multiplying mechanism is enabled to perform the ordinal digitation operations, the bellcrank 765 is freed from this control. Then, if the other conditions permit, the interponent 751 is free to rise to enable the squaring feed mechanism.

It was also mentioned above that the shaft 790 (FIG. 13) is rocked at the start of the multiplication operation (counterclockwise in this figure). In the present invention, the lever 789 is formed as a rocker with a forwardly extending arm 792, which arm also overlies the pin 766. Thus, when the shaft 790 and lever 789 are in the normal position shown, the arm 792 engages pin 766 and holds the bellcrank 765 in the rocked and inoperative position shown. The initiation of the multiplication operation and the consequent rocking of shaft 790 (counter-clockwise in this figure) causes arm 792 to release pin 766. Thereupon the bellcrank 765 is permitted to rock from the force of spring 757 if the other two controls are in condition for a squaring operation.

(e) INTERORDINAL SHIFT CONTROL
(FIGS 5, 6, 9, 18 AND 30)

The interordinal shifting operation is initiated whenever the operative one of the value storage devices 700 reaches a "0" position. It is seen in FIGS. 6, 9 and 30 that a series of ordinally arranged "0" sensing arms 850 are mounted on the shaft 625 immediately adjacent each arm 716. Each of the arms 850 is pinned to, or otherwise rigidly secured on, the shaft 625. The shaft 625 is under considerable pressure to rock it forwardly (in a counter-clockwise direction in FIGS. 9 and 30) from the force of a spring 851 (FIG. 18) tensioned between the rocker 628 for controlling operation of the shift clutch 631. The pawl is pivotally mounted on the transverse shaft 609 and is connected by means of a link 627 to an arm 626 rigidly mounted on the left end of shaft 625.

It has already been mentioned that each factor storage member 700 carries a disk 703 (FIGS. 6 and 30) on its front end, which disk is provided with a zero notch 704 (see FIG. 6). When the storage sector stands at "0," the arm 850 registers with the notch 704 (as shown in FIG. 6). In that event the arms 850 and shaft 625 remain in the inoperative position shown. When the operative one of the value storage spools 700 is translated rearwardly by the rocking of its arm 716, and a value other than "0" is registered in the spool, the flange 703 will engage the upper end of arm 850 and hence rock all of the arms 850 and the shaft 625 (clockwise in FIGS. 9 and 30). This assembly of shaft 625 and arms 850 is held in the rocked position until the operative storage spool 700 is fed back to its "0" position. At this point, the arm 850 registers with the notch 704 and the assembly is permitted to rock (counter-clockwise in these two figures) from the force of spring 851 (FIG. 18).

It is apparent that the rocking of shaft 625 rearwardly (clockwise in FIGS. 9 and 30, and counter-clockwise in FIG. 18) is effective to rock clutch pawl 628 (FIG. 18) to release the shift clutch 631 to rotate to its half-cycle position in which it is caught by shoulder 632 on the pawl. Then when the shaft 625 is permitted to return to its normal position by the sensing of a "0" in the operative order, the rocking of shaft 625 (clockwise in FIG. 18) rocks lever 628 in the reverse direction so that it releases clutch pawl 629. Thereupon spring 633 which connects arm 634 (that is normally operated by shift control arm 356, FIG. 11) is effective to rock pawl 629 (clockwise in this figure to the position shown) to again release clutch 631 from its half-cycle position to enable it to return to the full-cycle position shown. Such return of the clutch 631 to its full-cycle position is effective to initiate an ordinal shift of the carriage B by the rocking of shaft 609, as is fully explained in the patent to Malavazos, No. 3,090,554.

The shaft 609 carries an arm 885 adjacent its right end (FIG. 4). A pin 886 affixed to the free end of this arm is embraced within a slot 887 (see also FIG. 8) formed in an arm 888 that is loosely mounted on the shaft 609. This second arm 888 is resiliently biased toward the left by a suitable compression spring 889 embracing shaft 609 and seated between arm 888 and the right side frame 86. The second arm 888, however, is held in the inoperative position shown when no value stands in the normal multiplier control unit by a bail 890, the left end of which abuts the multiplier carriage. When a value is inserted in the multiplier unit and the multiplier carriage escapes to the left, the arm 888 is shifted to the left by the force of spring 889. Thereupon the free end of arm 888 lies in a plane to engage a pin 891 carried by an arm 892 loosely mounted on shaft 332. The pin 891 engages the front end of the right shift control rod 337, whereby the rocking of shaft 609 is effective to operate the right shift clutch 221 when the arm 888 is permitted to escape to the left.

In the present invention the pin 891 is reversibly offset to provide a section 893 (FIGS. 4 and 8) which registers with arm 888 when that arm is in the normal position shown, and so offset as to be unaffected by the rocking of the arm; and a second section 894 to the right thereof and lying along the axis of pin 891. Thus, if arm 888 is shifted further to the right so as to lie in a plane opposite the second offset section 894, the rocking of the shaft 609 will be operative to cause a right shift operation even though no value is set into the normal multiplying mechanism. Such a right shift of arm 888 is secured quite easily by shifting the bail 890 an additional increment to the right by means of a bellcrank 895 (FIGS. 9, 11 and 12) which is pivotally mounted on the framing by any suitable means, such as pivot stud 896. An ear 897 on the forward leg of the bellcrank is interposed between the bail 890 and the multiplier carriage. The bellcrank 895 is rocked by the forward translation of link 801, an ear 898 on that link (FIGS. 11 and 12) engaging the leftwardly extending arm of the bellcrank. Thus, the setting of the machine for squaring, by the rocking of shaft 592 (FIG. 11) conditions the machine for a shift of the register carriage B even though no values stand in the normal multiplication mechanism.

(f) TERMINATION. (FIGS. 5, 6, 9, 11, 12, 16 AND 18 TO 21)

It is obvious that a squaring operation, or any multiplication controlled by the auxiliary register, could be continued entirely across the register and terminated only when the highest order was returned to "0." However, it is also obvious that much time would be saved by an operator if the operation is terminated as soon as the highest order in which a value has been inserted has been returned to "0." This result is readily effected by a simple "termination sensing," i.e., a sensing of "0's" across the entire register, and such a mechanism is accordingly included in the preferred form of our invention.

The front end of the link 801 (FIGS. 9, 11 and 12) is formed with a "live tip," or extensible section, 815, which is mounted thereon by a suitable pin-and-slot connection including pins 805 in link 801 embraced by slots 816 in the forward section, or "live tip" (FIGS. 9 and 12). The front end of the live tip 815 is slidably mounted on the base plate 85 by a suitable pin-and-slot connection which includes the pin 817 (FIG. 9) which is embraced within a slot (not shown) in the section. A relatively strong spring 820 is tensioned between the forward pin 805 on link 801 and a depending ear 818 on the rear end of the live tip 815.

The front end of the live tip 815 is formed with an upwardly extending ear 819 (FIGS. 9, 20 and 30) adapted to engage the right leg 825 of a bail 826. The right leg of the bail is rigidly mounted on a shaft 827 which extends from the intermediate frame plate 87 to the right frame plate 86 (see FIG. 6). This shaft carries a "0" sensing comb 828 (FIGS. 5, 6, 9 and 30) rigidly secured thereto, the teeth 829 of which are adapted to engage "0" notches 830 in a set of "0" cams 831 rigidly secured to the front end of each shaft 586. Thus, the forward translation of the squaring control link 801 puts the live tip 815 under spring-tension from spring 820, causing it to engage the lower end of leg 825 of bail 826 and hence rock the "0" sensing comb 828 (clockwise in FIGS. 9 and 30 and counter-clockwise in FIG. 5). When so rocked, the teeth 829 of the comb rock downwardly. If any one of the teeth 829 engages the periphery of the "0" cams 831, the comb is held in an intermediate position, with the end of such teeth engaging the periphery of the "0" cam. However, if all of the cams stand at "0," then the comb 828 is enabled to rock to the full extent of its throw, and the teeth 829 lie within the slots 830 (FIG. 6). It is thus apparent that when the comb 828 senses an all "0" condition of the squaring storage members 700, the bail 826 is enabled to rock to its fullest extent (clockwise in FIGS. 9 and 30 and counter-clockwise in FIG. 5).

The left end of the bail 826 is pivotally mounted on the left side control plate 94 by any suitable means, such as a pivot stud 835 (FIGS. 16 and 18 to 20). The lower end of the left leg 836 of the bail 826 supports the forward end of an extensible link 837, 838 (FIGS. 16, 19 and 20). The forward section 837 of this link is provided with a slot 839 which engages a pin 840 riveted to the front end of the rearward section of the link 838. The rear end of the second section 838 is pivotally mounted on the clutch control pawl 841. The clutch control pawl is pivotally mounted on the left side control plate by any suitable means, such as pivot stud 842. This pawl carries the shoulder 843 which engages the ear 545 (see FIG. 21) that holds the clutch 530 in the 180° position. Thus, when the "0" sensing comb 828 (FIGS. 5, 6, 9 and 30) engages the "0" notches 830 of the "0" cams 831, it is enabled to rock from the force of spring 820. Thereupon the rocking of the bridge, or bail, 826 (counter-clockwise in FIG. 16) pulls the link 837, 838 forwardly, rocking the clutch pawl 841 in the counter-clockwise direction to remove the shoulder 843 from under ear 545. Thereupon, the clutch 530 is again enabled and is permitted to rotate from its 180° to its full cycle position in two succeeding cycles of operation. This second engagement of clutch 530 can occur only when all of the multiplier storage spools 700 are returned to their "0" position and at this time it is obvious that the squaring operation has been completed.

(6) *Operation*

It is believed that the operation of the mechanism of the present invention will be readily apparent from the preceding description. In a squaring operation, the value that is to be squared is placed in the main keyboard keys 51 (FIG. 1). If a value is standing in the normal multiplier mechanism controlled by the value keys 63, it must first be cleared by known means, such as the multiply clear key 67. It will be recalled that it was mentioned earlier that the normal multiplication mechanism will control any multiplication operation which follows. If no values stand in the multiplier mechanism, then the auxiliary clutch 530 (FIGS. 16 and 19) is operated instead of the usual multiplier control clutch 363.

The operation of the clutch 530 is controlled by the clutch pawl 515, which is operated in a squaring operation instead of the usual multiplier clutch pawl 364. This clutch 530 is what might be called a "quarter cycle" clutch in that it rotates 90° to a stopping point in each of four cycles of operation. The first two cycles follow the rocking of the clutch pawl 515, in two successive cycles of machine operation. The first of these two cycles is effective to set a "back-transfer" mechanism, such as that described in the Malavazos patent, No. 3,045,907, and which includes clutch members 584, 585 (FIG. 2). Then, in the second machine cycle, and in the second increment of rotation of the clutch 530, the value standing in the keyboard is set into the auxiliary register members 700. At the end of this cycle, the ear 545 of clutch member 530 is caught on the shoulder 843 of the second clutch pawl 841 (FIG. 21) and the clutch is latched in its half-cycle, or 180°, position. The rotation of the clutch 530 to the 180° position has rotated the cam 565 from the position shown in FIG. 24 to that shown in FIG. 26, thereby rocking the arm 590 and shaft 592 (counter-clockwise in these figures).

The rocking of shaft 592 rocks arm 593 (FIG. 19) affixed thereto and shifts the link 594 forwardly. Such translation of the link 594 causes the ear 621 formed thereon (see also FIG. 16) to engage the ear 508 on the lower end of the normal clutch pawl 364, and thereby initiate operation of the multiplier mechanism shown and described in the Malavazos patent, No. 3,090,554. Such translation of the link 594 is also effective to shift the restore feed pawl 657 (FIGS. 19 and 20) to an inoperative position and the cam feed pawl 656 to an operative position. The feed pawl 656 is thereafter operated by arm 686 (FIGS. 28 and 29) to engage ratchet wheel 650 and thereby rock the cam shaft 635 about 32° (one-eleventh of a full rotation) to set the cams 645 to an operative position.

The rocking of shaft 592 is also effective, by means of the mechanism shown particularly in FIGS. 11 and 12, to disable the operation of the normal multiplying mechanism through the forward translation of link 810 and to enable operation of the squaring feed mechanism including the rocker 739, link 751, bellcrank 752 (see also FIG. 4), and the feed bar 725 (see also FIGS. 30 and 31; and to set the termination sensing mechanism including the bail 828 (FIGS. 9 and 30) to engage the "0" cams 831 under the load of spring 820.

The reciprocation of the feed bar 725 (FIGS. 4, 30 and 31) reciprocates all of the live tips 726. Only one multiplier control element 700 can be operated at any one time, and the selection of the order in which operation is to take place is controlled by the cams 645 on shaft 635. When the cam is rocked to the operative position shown in dotted lines in FIG. 30, the cam follower bellcrank 716 is rocked to the dotted line position shown in that figure, thereby shifting the multiplier control segment element 700 rearwardly, so that the ratchet gear 702 is engageable by the ear 728 on the feed bar. Such translation of an element 700 rearwardly on its shaft 586 causes the front flange 703 to engage the coordinal arm 850 which is rigidly mounted on shaft 625, thereby disabling the multiplier shift mechanism. This shift mechanism is shown in FIG. 18, and includes arm 626 on shaft 625, link 627, bellcrank 628, and the multiplier clutch pawl 629. When the operative one of the multiplier control elements 700 is returned to a "0" position, the arm 850 is enabled to rock forwardly, thereby releasing clutch pawl 629 (FIG. 18) to cause a shift operation of the carriage, which operation also rocks the cam shaft 635 one additional increment, to bring the adjacent higher order into operative control of the machine.

When all of the multiplier segments 700 stand at "0," the sensing bail 828 (FIGS. 6 and 30) is permitted to drop into the notches of these cams, thereby pulling link 837, 838 (FIG 16) forwardly an additional increment to cause the shoulder 843 (FIG. 21) to release ear 545 and thereby again operate clutch 530 through two successive cycles of operation. In the first of these cycles, the rotation of the cam 565 (FIGS. 24, 25 and 26) releases all of the elements controlled thereby, and thereupon permits the operation to be terminated with the machine in the normal position.

It will be apparent that the mechanism of the invention could be utilized for ordinary multiplication either in substitution for, or in conjunction with, the normal multiplication mechanism shown in the Friden patents, Nos. 2,371,752 and 2,399,917. In that event, the machine would be stopped after the back-transfer operation, which could be under the control of the present clutch 530, or under the control of the mechanism shown in the Malavazos patent, No. 3,045,907. Then the multiplicand could be set in the keyboard and the multiplier clutch released. In such a machine, it would normally be assumed that the clutch 530 would be eliminated and the back-transfer control clutch and the conventional multiply clutch would be utilized in two separate operations.

It will be understood that while the present invention has been shown and described as embodied in the machine of the type disclosed in the Friden and Malavazos patents above-mentioned, this invention is not limited to incorporation in such a machine, but may be applied to other commercial calculating machines.

We claim:
1. In a calculating machine having:
 (a) a main keyboard;
 (b) an accumulator register;
 (c) an actuating mechanism for setting values standing in said keyboard into said accumulator register;
 (d) means for ordinally shifting said register;
 (e) a multiplier keyboard;
 (f) means for storing a multiplier factor; and
 (g) means controlled by said last-mentioned means for operating said actuating mechanism and said shifting means under the control of said multiplier factor storage means;
an auxiliary multiplying mechanism comprising:
 (1) a plurality of auxiliary multiplier storage members ordinally aligned with said keyboard;
 (2) means for setting a value standing in said keyboard into said auxiliary storage members;
 (3) a feed means for returning said auxiliary storage members to a "0" position;
 (4) ordinal selection means for determining the ordinal auxiliary storage member to be engaged by said feed means;
 (5) means for sensing the "0" position of the auxiliary storage members;
 (6) means operated by said "0" sensing means for terminating operation of said feed means and operating said shifting means to shift said accumulator register one order and adjusting said ordinal selection means to cause operation of an ordinally adjacent auxiliary multiplier storage member;
 (7) means for sensing a value in said multiplier factor storing means; and
 (8) means operated by said last mentioned means for enabling or disabling the feed means and the ordinal selection means.

2. In a calculating machine having:
 (a) a main keyboard;
 (b) an accumulator register;
 (c) an actuating mechanism for setting values standing in said keyboard into said accumulator register;
 (d) means for ordinally shifting said register; and
 (e) a multiplying mechanism including a multiplier keyboard;
 (f) means for storing a multiplier factor shiftable as a unit from an inoperative home position as values are inserted thereinto by operation of said multiplier keyboard; and
 (g) means controlled by said multiplier storing means for operating said actuating mechanism and said shifting means under the control of said multiplier storing means;
an auxiliary multiplying mechanism comprising:
 (h) an auxiliary multiplier register containing rotatable storage members ordinally aligned with said main keyboard and shiftable along their axes of rotation from a normal inoperative position to an operative position;
 (i) means for setting a value standing in said keyboard into said auxiliary register;
 (j) a common feed means for returning all of said storage members in an operative position to a "0" registration;
 (k) cam means for positioning one only of said auxiliary storage members to its operative position;
 (l) means for sensing the "0" position of the operative auxiliary storage member;
 (m) means operated by said "0" sensing means for operating said shifting means to shift said accumulator register one order and adjusting said cam means to cause return of the operative one of said storage members to its inoperative position and positioning the adjacent storage member in its operative position; and
 (n) means controlled by the ordinal position of a normal multiplier storage element for enabling or disabling the feed means and the cam means.

3. In a calculating machine having:
(1) a value indexing mechanism,
(2) an ordinally arranged accumulator register,
(3) actuating means for setting a value determined by said value indexing mechanism into said register additively or subtractively,
(4) means for shifting the relative ordinal positions of said value indexing mechanism and the register with respect to each other, and
(5) a multiplying mechanism including:
    (a) an auxiliary value indexing mechanism for said multiplying mechanism,
    (b) a plurality of ordinally arranged multiplier storage members shiftable as a unit,
    (c) a multiplying control mechanism including a multiplying program clutch for controlling operation of the actuating means and the shifting means to set the value standing in the indexing means into the register under the sequential control of the multiplier storage elements,
    (d) means for sensing the ordinal position of the multiplier storage register, and
    (e) multiply control keys for initiating operation of said multiplying mechanism additively or subtractively;

a squaring mechanism comprising:
(6) an auxiliary storage register coordinally arranged with said value indexing mechanism, said auxiliary storage register including in each order a shiftable storage gear;
(7) means for setting a value standing in said indexing means into said auxiliary storage register;
(8) a normally inoperative feed bar for returning any of said storage gears in an operative position toward "0,"
(9) ordinal selecting means operative to shift one only of said storage gears from a normal inoperative position into an operative position with respect to said feed bar;
(10) means for sensing the return of the operative one of said auxiliary storage gears to "0";
(11) means operated by said "0" sensing means for operating the shifting means and the ordinal selecting means and thereby simultaneously disable the previously operative storage gear and enable the operation of the adjacent storage gear;
(12) an auxiliary program clutch effective when operated to first effect operation of said means for setting a value standing in said value indexing means into said auxiliary storage register and disable operation of the multiplier storage members, and thereafter operating said multiplying mechanism clutch under control of said "0" sensing means while simultaneously enabling operation of said feed bar and said ordinal selecting means; and
(13) means controlled by the means for sensing the ordinal position of the multiplier storage register for determining the operation of the multiplying clutch or the auxiliary clutch upon depression of a multiply control key.

4. In a calculating machine having:
(1) an ordinally arranged value indexing mechanism;
(2) an ordinally arranged accumulator register;
(3) actuating means for setting a value determined by said value indexing mechanism into said register additively or subtractively;
(4) means for shifting the relative ordinal positions of said value indexing mechanism and the register with respect to each other; and
(5) a multiplying mechanism including:
    (a) an auxiliary value indexing mechanism for said multiplying mechanism;
    (b) a plurality of ordinally arranged multiplier storage members shiftable as a unit as values are inserted therein;
    (c) a multiplying control mechanism including a multiplier program clutch for controlling alternate operation of the actuating means and the shifting means to set the value standing in the indexing means into the register under the sequential control of the multiplier storage members;
    (d) means for sensing the ordinal position of the multiplier storage members; and
    (e) multiply control keys for initiating operation of said multiplying mechanism additively or subtractively;

a squaring mechanism comprising:
(6) an auxiliary storage register ordinally aligned with said value indexing mechanism and containing rotatable, and ordinally arranged, storage gears shiftable along their axes of rotation from a normally inoperative to an operative position;
(7) means for setting a value standing in said indexing mechanism into said auxiliary storage register;
(8) normally inoperative common feed bar for returning any of said storage gears in an operative position toward "0";
(9) order selection means operative to shift one only of said storage gears into its operative position in which it is engaged by said feed bar;
(10) means for sensing the return of the operative one of said storage gears to "0";
(11) means operated by said "0" sensing means for operating the multiplier program clutch to cause operation of said shifting means and the order selection means to thereby simultaneously disable the previously operative storage gear and enable the adjacent storage gear;
(12) an auxiliary program clutch effective when operated to first effect operation of said means for setting a value standing in said value indexing means into said auxiliary storage register, to disable operation of the multiplier storage members, and thereafter operate said multiplying mechanism clutch under the control of said "0" sensing means while simultaneously enabling operation of said feed bar and said order selecting means;
(13) means controlled by the means for sensing the ordinal position of the multiplier storage members for determining the operation of the multiplying clutch or the auxiliary clutch upon depression of a multiply control key;
(14) a second sensing means for sensing a "0" registration of all of the storage gears; and
(15) a means operated by said second sensing means for terminating machine operation.

5. In a calculating machine having:
(1) an ordinally arranged keyboard;
(2) an accumulator register shiftable with respect to said keyboard;
(3) an actuating mechanism for setting the value determined by said keyboard into said accumulator register;
(4) means for shifting said accumulator register with respect to said keyboard; and
(5) a main multiplier mechanism including:
    (a) mechanism for storing a multiplier factor;
    (b) means for setting values into said multiplier storage mechanism; and
    (c) a multiplier control means controlled by said multiplier storage mechanism for operating said actuating mechanism and said shifting means to multiply a factor standing in said ordinally arranged keyboard by a factor standing in said multiplier storage mechanism;

an auxiliary multiplier mechanism which comprises:
(6) an ordinally arranged auxiliary register aligned with said keyboard and containing shiftable toothed wheels normally lying in an inoperative position;
(7) means for entering a value set in said keyboard into the coordinal toothed wheels;

(8) a common feed bar operative in all orders of said auxiliary register and effective to return any toothed wheel in an operative position toward "0";

(9) cam means for shifting one only of said toothed wheels from its inoperative into an operative position in which it is operated by said common feed bar;

(10) means for sensing the return of the toothed wheel in an operative position to "0";

(11) means operated by said sensing means for operating said register shifting means and said cam means, thereby shifting the previously operative toothed wheel to its inoperating position and shifting the adjacent toothed wheel from its inoperative to its operative position;

(12) means for sensing a value in said multiplier storage mechanism; and

(13) means operated by said last mentioned means when sensing no value in said multiplier storage mechanism for enabling the feed bar and the cam means and simultaneously disabling the main multiplier control means.

References Cited by the Examiner

UNITED STATES PATENTS

| | | | |
|---|---|---|---|
| 2,157,411 | 5/1939 | Hopkins | 235—61 |
| 2,905,382 | 9/1959 | Carnacina | 235—60 X |
| 3,000,557 | 9/1961 | Ellerbeck | 235—63 |
| 3,107,851 | 10/1963 | Malavazos et al. | 235—63 |
| 3,107,852 | 10/1963 | Plunkett et al. | 235—63 |

LEO SMILOW, *Primary Examiner.*

S. J. TOMSKY, *Assistant Examiner.*